United States Patent [19]

Burge

[11] 4,243,617
[45] Jan. 6, 1981

[54] FLEXIBLE FOAM REBONDING PROCESS AND APPARATUS

[75] Inventor: Russell W. Burge, Covina, Calif.

[73] Assignee: Mobay Chemical Corporation, Pittsburgh, Pa.

[21] Appl. No.: 95,134

[22] Filed: Nov. 16, 1979

[51] Int. Cl.³ .................. B29D 27/00; B29C 29/00
[52] U.S. Cl. ........................... 264/39; 264/109; 264/155; 265/158; 264/DIG. 7; 425/225; 425/290; 425/345; 425/348 R; 425/350
[58] Field of Search .............. 264/109, 123, DIG. 7, 264/37, 155, 158; 425/345, 348 R, 350, 225, 290

[56] References Cited

U.S. PATENT DOCUMENTS

| | | |
|---|---|---|
| 3,114,722 | 12/1963 | Einhorn et al. ............ 264/DIG. 7 |
| 3,209,406 | 10/1965 | Hopkins et al. ..................... 425/350 |
| 3,300,421 | 1/1967 | Merriman et al. .......... 264/DIG. 7 |
| 3,401,128 | 9/1968 | Terry ............................. 264/DIG. 7 |
| 3,485,711 | 12/1969 | Fish, Jr. et al. . |
| 3,503,840 | 3/1970 | Parrish . |
| 3,517,414 | 6/1970 | Carson, Jr. .................... 264/DIG. 7 |
| 3,698,843 | 10/1972 | Bowles . |
| 3,717,597 | 2/1973 | Hesskamp et al. . |
| 3,726,624 | 4/1973 | Schwartz .......................... 264/109 X |
| 3,730,917 | 5/1973 | Hesskamp . |
| 3,772,210 | 11/1973 | Schwarz . |
| 3,867,077 | 2/1975 | Deprez . |
| 3,894,973 | 7/1975 | Yunan . |
| 3,992,238 | 11/1976 | Johns ............................. 264/46.4 X |

Primary Examiner—Philip Anderson
Attorney, Agent, or Firm—Gene Harsh; Joseph C. Gil

[57] ABSTRACT

The instant invention is directed to a novel process and apparatus for the production of rebonded foam, and particularly polyurethane foam scrap. The process and apparatus allow for the simultaneous performance of three and preferably four basic operations, i.e. mold filling, curing or steaming, boring and mold stripping, to achieve the shortest, most efficient time cycles to produce a high quality rebonded product. Significant improvements are seen in the quality of the product, reduction in density, reduction in scrap loss, elimination of density variations in the molded product and overall product consistency.

60 Claims, 30 Drawing Figures

FLEXIBLE FOAM REBONDING PROCESS AND APPARATUS

BACKGROUND OF THE INVENTION

A substantial amount of the materials used for carpet underlay are produced from rebonded flexible organic foam and preferably rebonded polyurethane foam. Rebonded foam is generally obtained by a process which broadly consists of applying a binder to small particles of foam, compressing the resultant mix and allowing the binder to fully cure.

In manufacturing rebonded foam and particularly polyurethane foam, foam particles are placed in a suitable mixing container, such as a ribbon blender, where the foam particles are subjected to vigorous mixing. As the foam pieces are being agitated, a binder is sprayed into the mixing container. After the foam and binder are thoroughly blended, the mixture is transferred to a mold and compressed or is transferred to continuously moving compression conveyors. In either case, the mixture is held in the compressed state until the resultant product is dimensionally stable. The resultant product may then be fabricated into whatever shape is required for the particular intended end use application. Typical of the continuous process is that described in U.S. Pat. No. 3,726,624.

The instant invention relates to the molding process noted above. When utilizing polyurethane foam, the so-called "molding" process generally produces a cylindrical roll or log of rebonded polyurethane foam. These rolls or logs are then cut to sheet materials. The molding procedures known to date suffer many disadvantages common to batch operations including high cost and relatively low production rates. Additionally, uniformity of density in the resultant sheets is difficult to achieve due to density variations within the log itself. Due to the lack of uniformity, significant amounts of scrap are produced. It is additionally extremely difficult to obtain reproducible and inconsistent products. Characteristic of this type of process are those described in U.S. Pat. Nos. 3,517,414; 3,114,722; 3,300,421; 3,401,128; 3,485,711; 3,503,840; 3,717,597; 3,730,917; 3,772,210; and 3,894,973.

One process available commercially consists broadly of the following steps: filling a mold with a mixture of foam and binder, compressing the mixture, curing the binder while the mixture is in the compressed state, drilling a hole in the cured product, and removing the mold from the product. Since so much of this process is dependent on human factors and due to the lack of strict control, significant problems are encountered such as foam loss at the filling station, variations in density of the final product, cores that are not perfectly centered and/or vertical (resulting in significant foam loss) and relatively low yields since the process is directly dependent on how fast the human worker can move the mold from station to station.

Finally, carousel-type apparatus are known for use in metal powder compacting equipment. Characteristics of the equipment are those described in U.S. Pat. Nos. 3,698,843 and 3,867,077.

BRIEF DESCRIPTION OF THE INVENTION

Figure 1:
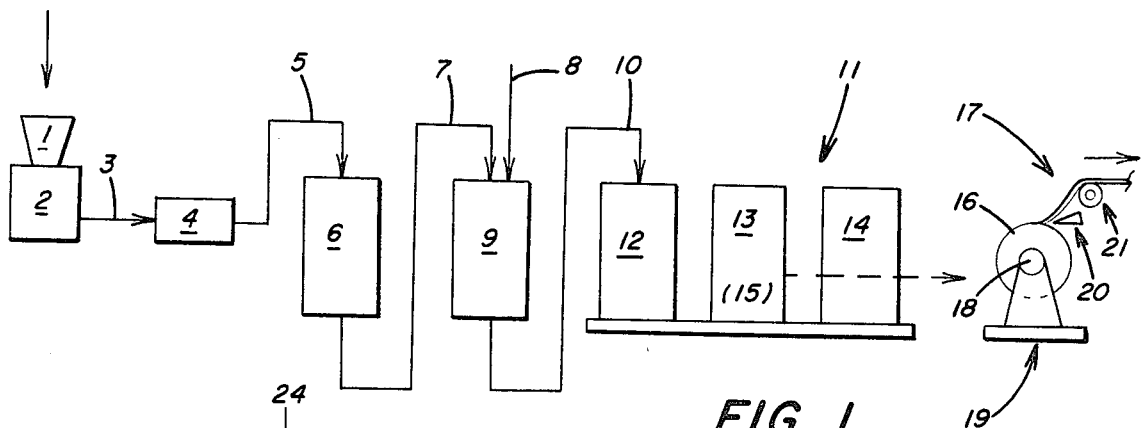
FIG. 1 represents a schematic diagram showing the location of the apparatus of the instant invention in the overall layout of a production facility for the manufacture of rebonded foam.

The instant invention is directed to a novel process and apparatus for the production of rebonded flexible foam and particularly rebonded polyurethane foam. The process and apparatus allow for the simultaneous performance of three, and preferably four, basic operations, i.e. mold filling, curing, mold stripping, and preferably drilling, to achieve the shortest, most efficient time cycles to produce a high quality rebonded product. Significant improvements are seen in the quality of the final product, reduction in density, reduction in scrap loss, elimination of top-to-bottom variations in the molded product and overall product consistency. Additionally, since the process is relatively simple, it is possible to utilize machinery which will occupy relatively little space in the overall production facility.

The process of the instant invention broadly comprises (A) filling a mold at a first station with a mixture of foam particles and binder and thereafter precompressing said mixture in said mold, (B) transporting the filled mold to a second station, (C) at said second station
  (i) passing gas through the bottom of said mold in order to fluff the mixture,
  (ii) compressing the fluffed mixture, and
  (iii) curing the compressed mixture, thereby forming a cured product, (D) transporting the mold to a third station, (E) at said third station,
  (i) lifting said mold away from the cured product,
  (ii) removing said cured product from under said mold, and
  (iii) lowering the empty mold, and (F) transporting said empty mold to said first station, wherein the operation of steps (A), (C) and (E) occurs substantially simultaneously, and wherein the transporting steps (B), (D) and (F) occur simultaneously.

In the most preferred embodiment, following step (C) and before step (D), the mold is transported to a drilling station to drill a hole vertically through the molded product. In this particular embodiment, the transporting step occurs simultaneously with the transporting steps (B), (D) and (F). Similarly, the actual drilling of the product occurs substantially simultaneously with the operation of steps (A), (C) and (E).

In yet another preferred embodiment, the internal mold surface is cleaned and/or a mold release agent is applied thereto as the mold is lifted away from the foam product.

It is most preferred that the foam particles be polyurethane foam particles. Additionally, it is preferred that the binder be moisture-curable and most preferred that the binder be an isocyanate terminated prepolymer of the type generally known in the art. Finally when using a moisture-curable binder, it is generally preferred that the curing step be accomplished by passing moist gas through the bottom of the mold for a time sufficient to cure the binder.

In a less preferred embodiment, the steps of fluffing and final compression can take place at the first or filling station.

One apparatus for performing the process of the instant invention broadly comprises (A) a turntable having a plurality of recesses therein, each recess adapted to receive a cylindrical mold, (B) a plurality of cylindrical molds, (C) a driving means for rotating said turntable around a vertical support, said vertical support located in the center of said turntable, (D) a first station located above said turntable for filling a mold with a mixture of foam particles and binder when one of said molds set in said recesses is located thereunder, said first station comprising
  (i) a means for filling a mold with said mixture, and
  (ii) a pressing means for precompressing said mixture in said mold, (E) a second station for curing said mixture in said mold when one of said molds set in said recesses is located thereat, said second station comprising
  (i) a means for blowing gas through the bottom of the recess located at said second station and through the bottom of a filled mold,
  (ii) a pressing means located above said turntable for compressing said mixture in said mold, and
  (iii) a means for curing the binder, (F) a third station located above said turntable for removing a mold from said turntable, said third station being operative when one of said molds set in said recesses is located thereunder, and comprising
  (i) a lifting means for lifting a mold located on said turntable away from said turntable, and
  (ii) a lowering means for lowering a mold onto a recess of said turntable, wherein the location of said recesses in said turntable is such that when a recess is located at any one station, a recess is located at each station. In the most preferred embodiment, the first, second and third stations are structurally connected to the vertical support.

In a particularly preferred embodiment, a station is provided between the second and third stations for drilling a hole through the center of the molded product. As with the broadly described apparatus, this drilling station is preferably structurally connected to the vertical support. Similarly, when a recess is under the first three stations, a recess will be located beneath the drilling station.

In yet another preferred embodiment, the third station is provided with a cleaning means and/or a mold release agent application means structurally and functionally related to the lifting means.

As noted earlier, in the case where the binder used is moisture-curable, it is preferred that the curing means comprise a means for blowing moist gas through the bottom of the recess located at the second station and through the bottom of the filled mold.

One of the keys to the instant invention resides in the fluffing step. While not wishing to be bound to any particular theory, it is believed that by passing gas through the precompressed mixture, the foam particles are disturbed and moved relative to one another so that the space to solid ratio throughout the mixture is more evenly distributed. Thus, in the processes known in the art, it is believed that the foam particles formed groups or clusters by the cohesive forces of the particle surfaces which had been compressed together. According to the invention herein, it is believed that these groups or clusters are broken up and dispersed with unclustered particles, thereby allowing more surface to surface particle contact. Thus, it is believed that by fluffing the particles before curing the binder, a more uniform distribution of the binder on more of the surfaces of each particle so that the resultant rebonded foam has a more uniform density and may even have a greater tear strength.

DETAILED DESCRIPTION OF THE INVENTION

Reference will now be made to the drawings for a detailed description of the process and apparatus. It should be noted that the drawings are for illustration purposes and are not necessarily drawn to scale.

FIG. 1 represents a schematic drawing showing the instant invention, in the overall layout of a production facility for the manufacture of rebonded and particularly rebonded polyurethane foam. In the production of foam materials (and polyurethane foam in particular), substantial amounts of foam scrap are generated. Depending on the size of the foam scrap pieces, it is in many instances necessary to first reduce the size of the foam to a size where any grinding equipment used will be effective. In this case, the foam would be fed to a hopper 1 which feeds a cutter or grinder 2 where the foam pieces are reduced in size (see, e.g., U.S. Pat. No. 3,452,127). The foam pieces leaving cutter or grinder 2 are generally still too large for the production of high quality rebonded foam and generally require further size reduction. The foam particles are then fed via 3 (which may be a simple conveyor or an open-ended conduit through which the foam pieces are blown) to a conventional comminuting or shredding apparatus such as grinder 4. The particle size of the shredded foam is not critical and will, of course, vary depending upon the type of grinding equipment used. Uniformity of particle size is not generally needed, and a typical shredded foam may contain particles smaller than 1/16 of an inch up to particles having at least one dimension of 2 or more inches. Additionally, the shredded foam may also contain minor amounts of a wide variety of other scrap material such as string, polyethylene film and baling wire. The shredded foam particles are then transported to a storage container or containers 6 via line 5 (which may again be a simple conveyor or an open-ended conduit through which the foam particles are blown). From the storage container, the shredded foam is transported via line 7 to a mixing container 9, such as a ribbon blender. While the foam particles are being agitated, the binder is added via inlet line 8, typically by spraying. As is known in the art, typically the binders used for the production of rebonded polyurethane foam are moisture curable and preferably are prepolymers formed from the reaction of an isocyanate, such as tolylene diisocyanate, and a polyol such as polyoxypropylene glycol which may contain minor amounts (e.g. up to 15% by weight) of ethylene oxide. As is known in the art, the economy of the manufacture of the rebonded product is dependent on the amount of prepolymer which must be used and the time needed to cure the prepolymer. In any event, the instant invention can be used with essentially any of the prepolymers known and used in this art. One suitable prepolymer system is that described in U.S. Pat. No. 4,082,703. Of course, it is to be recognized that essentially any type of binder could be used including heat curable binders of the type generally known in the art.

Once thorough blending of the foam particles and binder is achieved, the mixture is transferred to the apparatus 11 of the instant invention via feed line 10 (which could be any suitable means such as a conveyor belt or a tube through which the mixture is blown). The apparatus shown in FIG. 1 consists of filling station 12, a curing or steaming station 13, a stripping station 15 and optionally, a drilling station 14, all of which will hereafter be described in more detail.

From the stripping station 15, the molded foam product 16 can be conveyed to a peeler assembly 17. The peeler assembly generally comprises a rotating mandrel 18 which passes through the hole of the product 16 formed at the drilling station (or formed during molding) suitably supported by 19. The product 16 is rotated against a knife blade 20 and the resultant sheet product passes over idler roller 21 and is suitably collected.

The hopper 1, cutter 2, shredding equipment 4, storage container 6, mixing container 9, peeling assembly 17 and the various feed lines 3, 5, 7 and 10 are all of conventional structure and do not constitute a part of the present invention.

Reference will now be made to the various portions of the instant invention and will be specifically directed to the turntable structure, the turntable driving means, the mold structure, the fill station, the curing or steam station, the boring or drilling station, the stripping station and the overall operation.

TURNTABLE STRUCTURE

In describing the turntable structure, specific reference will be made to FIGS. 2, 2A, 8, 14 and 14A.

Figure 2:
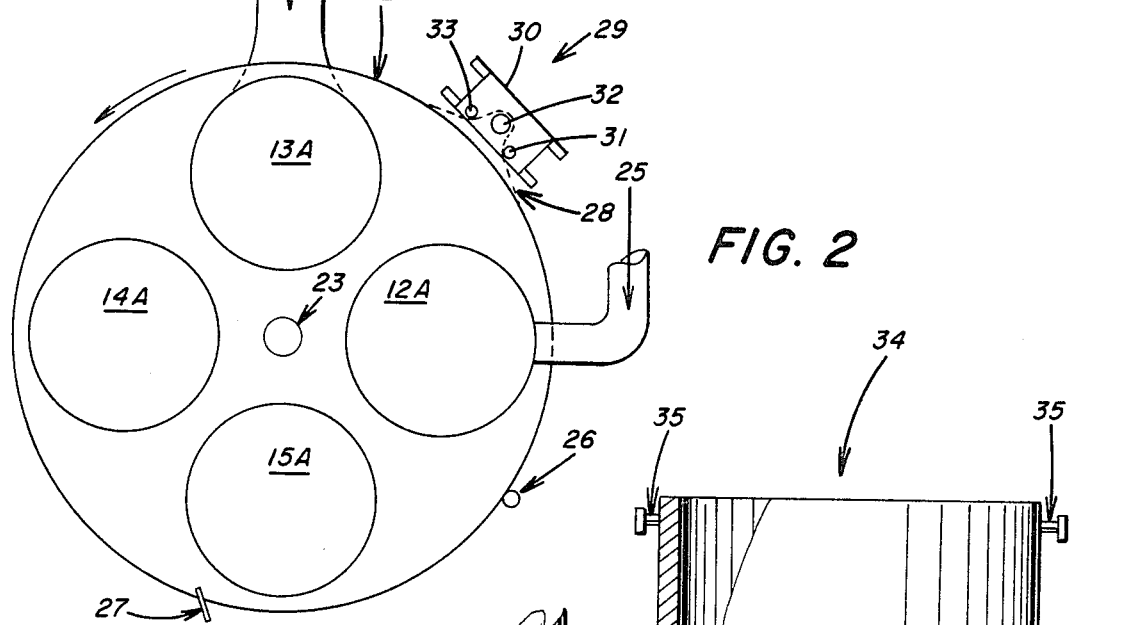
FIG. 2 is a top view of the turntable of the apparatus according to the instant invention.

FIG. 2 represents a top view of a turntable useful according to the instant invention. The turntable 22 is a circular structure as shown and obviously could take any other suitable geometrical form. The turntable 22 is provided with recesses 12A, 13A, 14A and 15A adapted to receive molds for performance of the process. The turntable 22 is adapted to rotate around the axis 23. As shown in FIG. 2, the gas inlet 24 enters from below the turntable 22, while the feed means 25 for the foam particle/binder mixture enters from above the turntable.

Figure 2A:
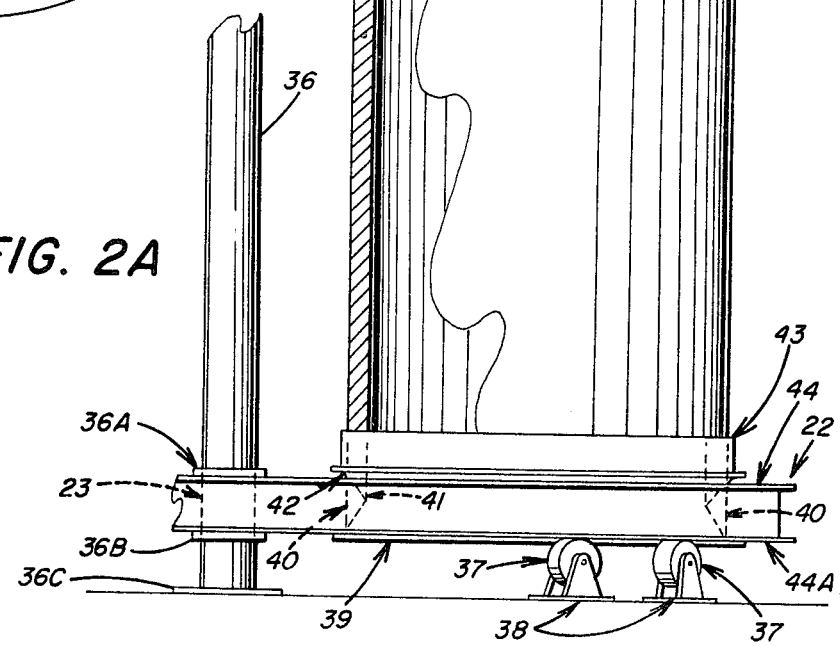
FIG. 2A is a view of a section of the apparatus of the instant invention showing a mold in place.

As shown in FIG. 2A, a vertical support 36 passes through an upper bearing 36A through the axis 23, and through a lower bearing 36B and is rigidly fixed to the ground via an anchor plate 36C. As is apparent from FIGS. 2 and 2A, the outer circumference of turntable 22 can be a continuous channel iron. A suitable surface, such as metal (e.g. steel) or wood is fitted over the top surface of the channel iron and under the bottom surface of the channel iron and is connected thereto (not shown) via any suitable means. The surfaces 44 and 44A may be suitably reinforced if desired and/or necessary in order to adequately carry the various loads applied during the process. Holes are provided in the upper and lower surfaces (which holes will be the recesses noted above) to accommodate placement of the molds 34 and to allow the vertical support to pass therethrough.

While the turntable may be allowed to freely rotate, it is preferred to rest the outside edge of the turntable on rollers 37. While the rollers could be fixed to the turntable itself, it is preferred to suspend the rollers above the ground by suitable supporting means 38 to allow for ease of cleaning beneath the turntable 22. Although only two rollers are shown, it is of course to be understood that a multiplicity of rollers can be positioned along the entire circumference of the turntable 22.

Figure 8:
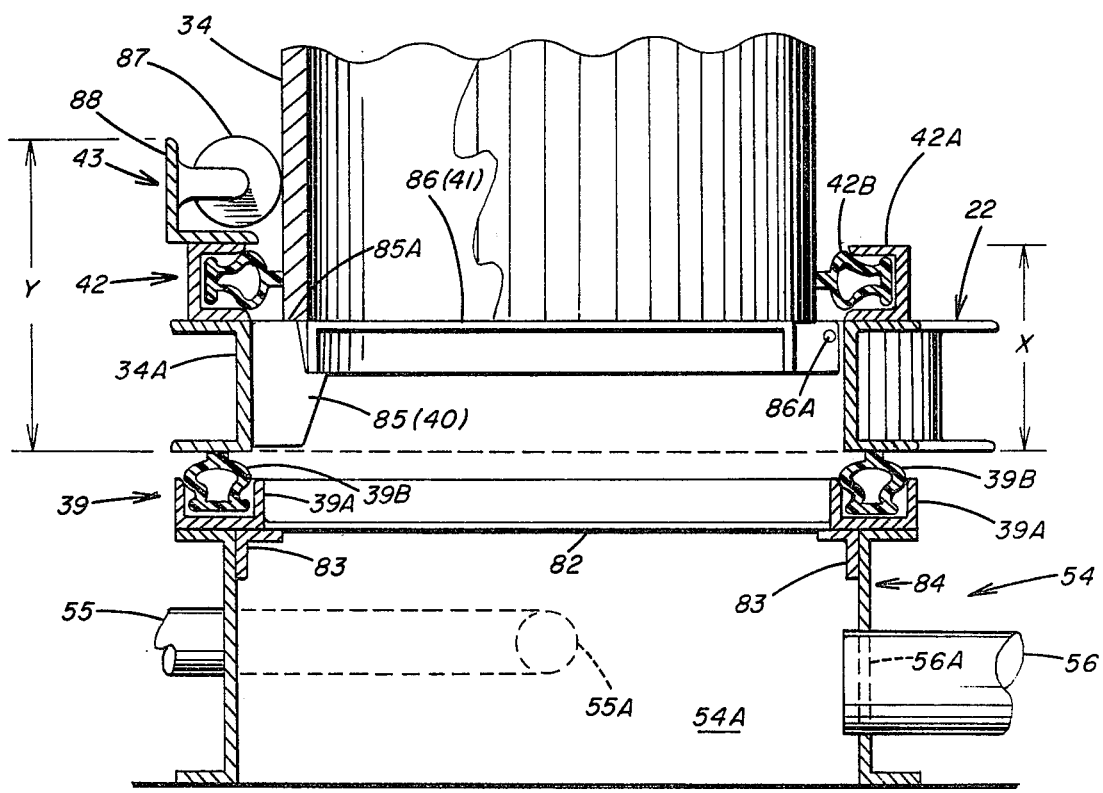
FIG. 8 is an expanded view of the lower steam and gas assembly of the curing or steaming station.
Figure 14:
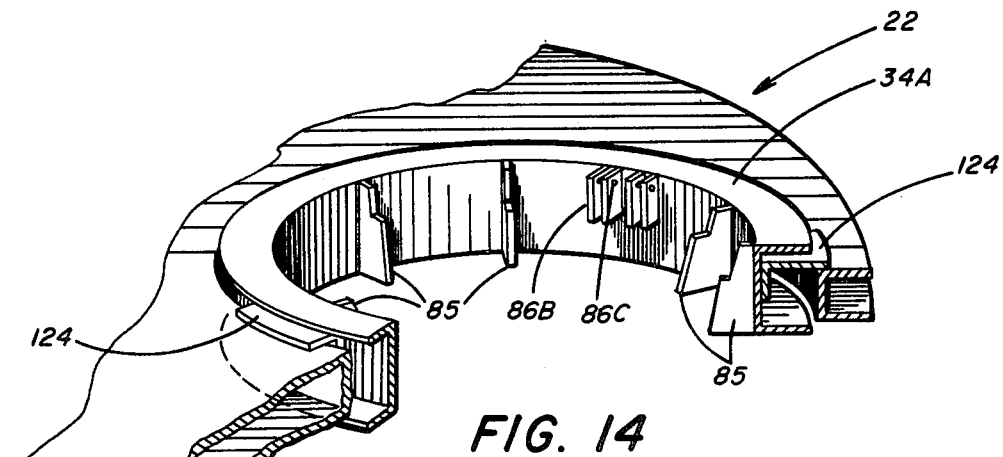
FIG. 14 is a perspective view of a portion of the turntable of the instant invention.
Figure 14A:
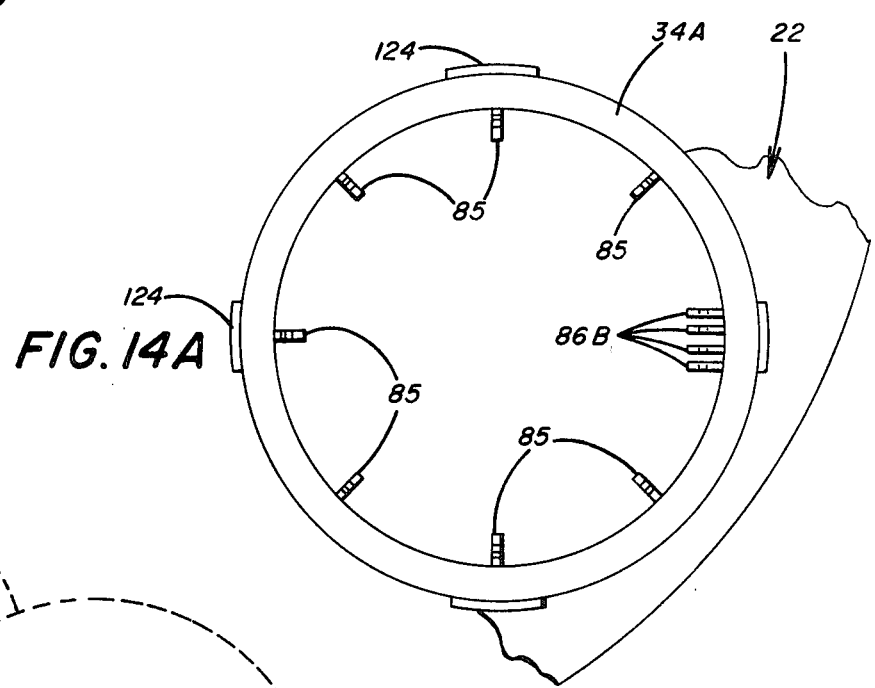
FIG. 14A is a top view of FIG. 14.
Figure 15:
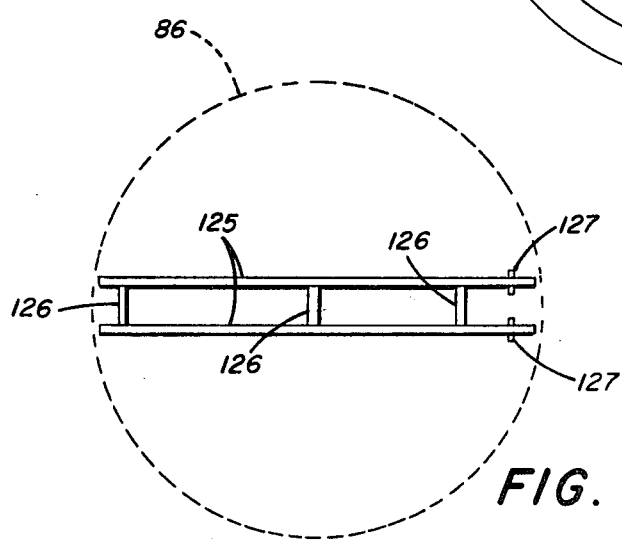
FIG. 15 is a top view of a bracing means to be used with a screen at the bottom of the mold.

Referring now to FIGS. 8, 14 and 14A, more detail of the recessed portions will be described. Each recess is fitted with a continuous channel iron 34A. The channel iron 34A can be provided with a plurality of L-brackets 124, the lower horizontal surface of which will rest on the upper surface of the turntable as shown in FIG. 14. Attached (as by welding) to the inside surface of each recess are a plurality of brackets or supports 85 (40 in FIG. 2A), which are preferably made of metal. In general, three or more brackets or supports 85 are spaced around the inside of the channel iron 34A. These supports 85 serve two functions. As is shown in FIG. 8, a metal screen 86 (41 in FIG. 2A) rests on a flat portion of the support 85. The upper surface of the screen 86 constitutes the bottom of the mold and is of such a height that such upper surface coincides with the bottom open face of the mold 34. The open-ended mold 34 rests on another flat portion or mold seat 85A of the support 85. As shown in FIG. 8, the thickness of the mold 34 is such that the internal diameter coincides exactly with the diameter of the screen 86 and such that a portion of the width rests on the support 85 at 85A. Since such a configuration might require the use of a relatively thick metal mold, it is preferred to attach a cylindrical piece (not shown) to the outside surface of the mold which piece supports the mold 34 on the support 85. Attached to the upper surface of the channel iron 34A is another continuous channel iron 42A in which channel is placed an inflatable seal 42B. The seal 42B is, as is known in the art, provided with an inflating/deflating valve (not shown). Typical useful seals include the G-12 seals sold by Seal Master Corporation. Attached to the upper surface of the channel iron 42A are three or more L-shaped brackets 88, which have guide rollers 87 mounted thereon. These guide rollers ensure that a mold lowered in place exactly rests over the recess. The section defined by the lines X and Y in FIG. 8 rotates as the turntable 22 rotates. While the turntable and recesses may be of essentially any size, the apparatus currently in use utilizes a turntable of about 15 feet in diameter and the recesses are approximately 5 feet in diameter.

TURNTABLE DRIVING MEANS

In discussing the turntable driving means, specific reference will be made to FIGS. 2, 10, 10A, 10B, 13, 13A and 13B.

Figure 10:
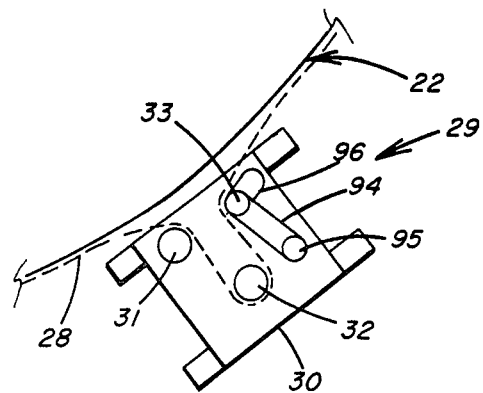
FIG. 10 is an expanded view of the driving means for the turntable of the instant invention.
Figure 10B:
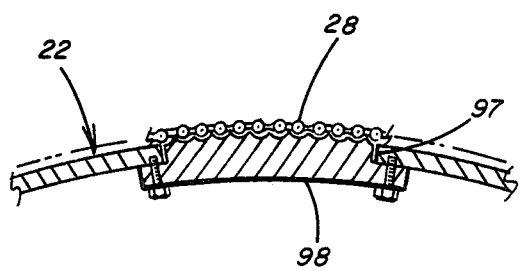
FIGS. 10A and 10B are expanded views of a turntable section showing the drive chain in place with FIG. 10B being a view of FIG. 10A along line B—B.
Figure 10A:
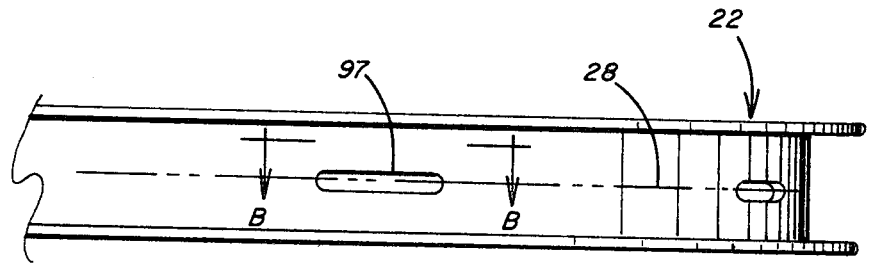

The turntable 22 can be driven via any suitable means. It is presently preferred, however, to utilize a driven sprocket and chain system. In the preferred embodiment, the chain 28 is passed around the outer circumference of the channel of the channel iron (see, e.g., FIG. 10A) and passes through the driving mechanism 29. In the driving mechanism, the chain passes over an idler sprocket 31, the driving sprocket 32 and a chain tightening sprocket 33. (For purposes of clarity, the chain has only been shown passing over a portion of the circumference of the channel iron, but it should be recognized that in practice the chain will completely circumvent the turntable). The tightening sprocket is preferably adjustable. As shown in FIG. 10, the chain tightening sprocket 33 is preferably connected via a rigid connector brace 94 to a pivot pin 95. A groove 96 is cut into the support 30 to allow for movement of the tightening sprocket. In general, the tightening assembly may also be provided with a tightening screw (not shown) for locking the tightening sprocket 33 in any one position. The drive assembly is suitably housed in a support 30, the details of which have been illustrated in FIG. 13. In general, the support 30 will be anchored to the floor via vertical channel irons 30A. The sprockets 31, 32 and 33 are then mounted on a support plate 118 in any suitable way. In the presently preferred embodiment, the sprocket 32 is driven via a hydraulic motor 32A such as Char-Lynn Orbit motor (not shown), but any suitable driven motor could be used.

In a particularly preferred embodiment, holes 97 (see FIGS. 10A and 10B) are cut through the channel of the continuous channel iron which forms the outer circumference of the turntable 22. One or more stationary tooth structures 98 are then inserted through the holes 97 and are fixed to the internal surfaces of the channel iron. The chain 28 may then be readily passed over the teeth of the structure 98. In essence, the turntable then becomes a large sprocket allowing for relatively easy rotation.

In a particularly preferred embodiment (note FIGS. 13, 13A and 13B), a turntable locking assembly 120 is made a part of the support 30. The locking assembly 120 is suitably attached via anchor plate 121 to a support plate 119, which is attached to vertical channel irons 30A. The assembly 120 consists of a pin 120A which can be moved towards and away from the turntable 22. The turntable 22 is provided with 3 or more (depending on the number of stations used) metal blocks 122, provided with recesses 123. The recesses 123 are adapted to receive the pin 120A when the turntable 22 has been moved to the station. Thus, when all the recesses are aligned at a station, the pin 120A is activated by a suitable means (e.g., spring or hydraulically) to move into a recess 123, thereby locking the turntable into position. When the operations are completed, the pin is retracted, and the turntable is then free to rotate.

MOLD STRUCTURE

Figure 6A:
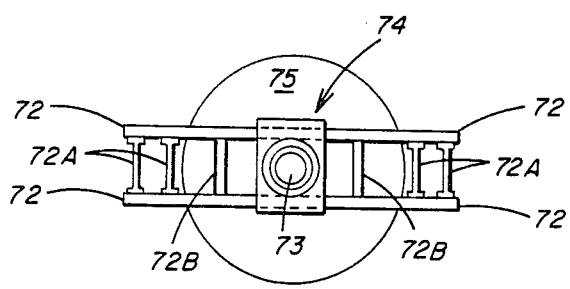
FIG. 6A is a view of the apparatus of FIG. 6 taken along line A—A.
Figure 6B:
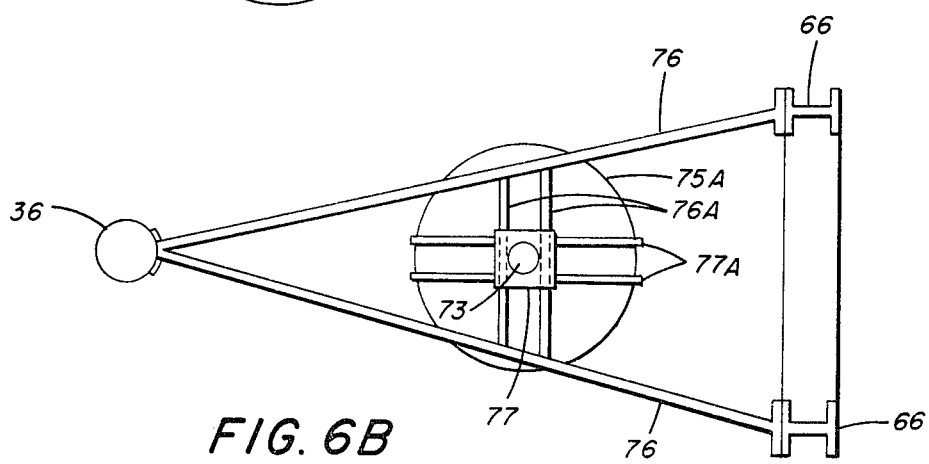
FIG. 6B is a view of the apparatus of FIG. 6 taken along line B—B.
Figure 6:
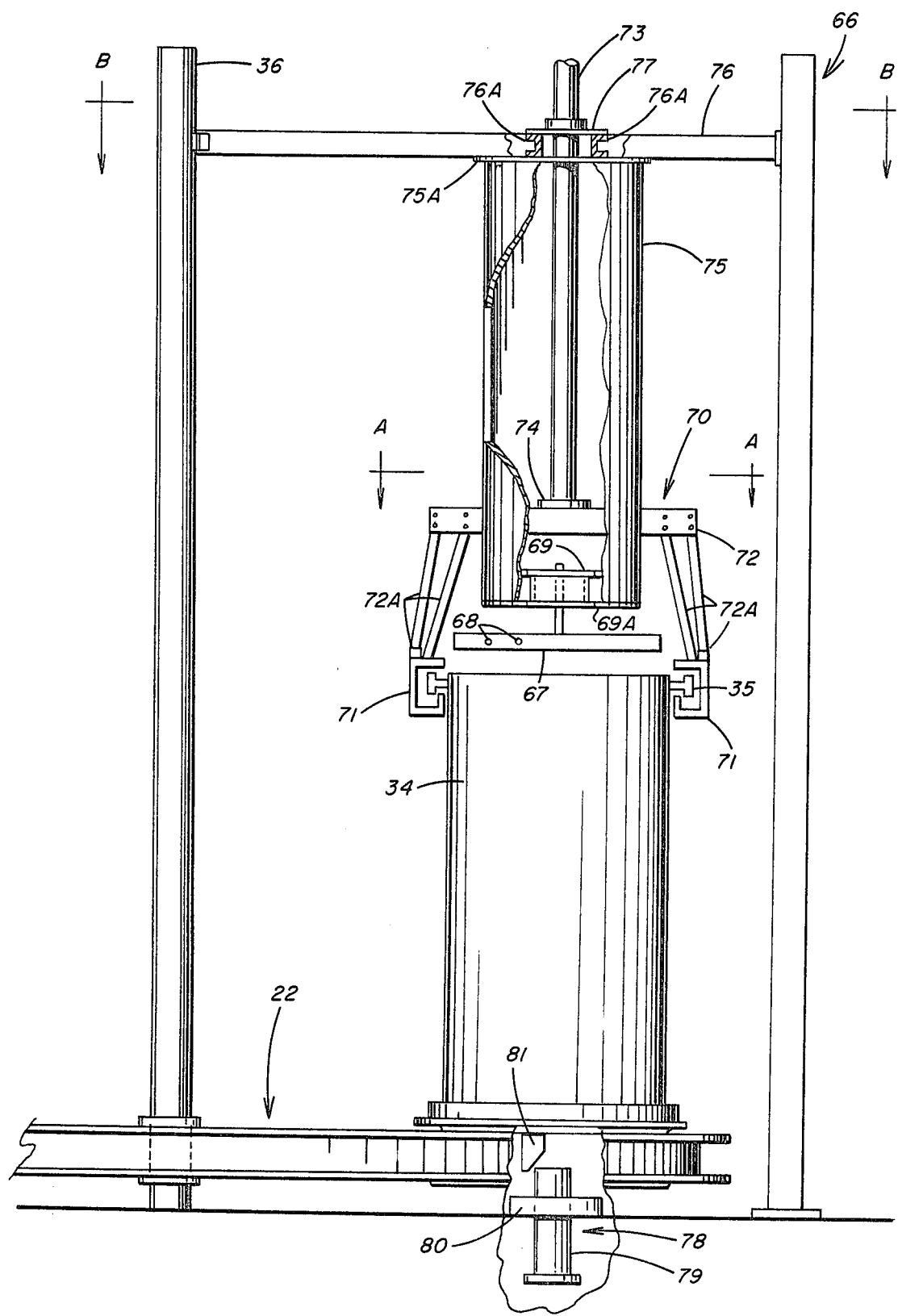
FIG. 6 is a view of the stripping station of the apparatus of the invention.
Figure 7:
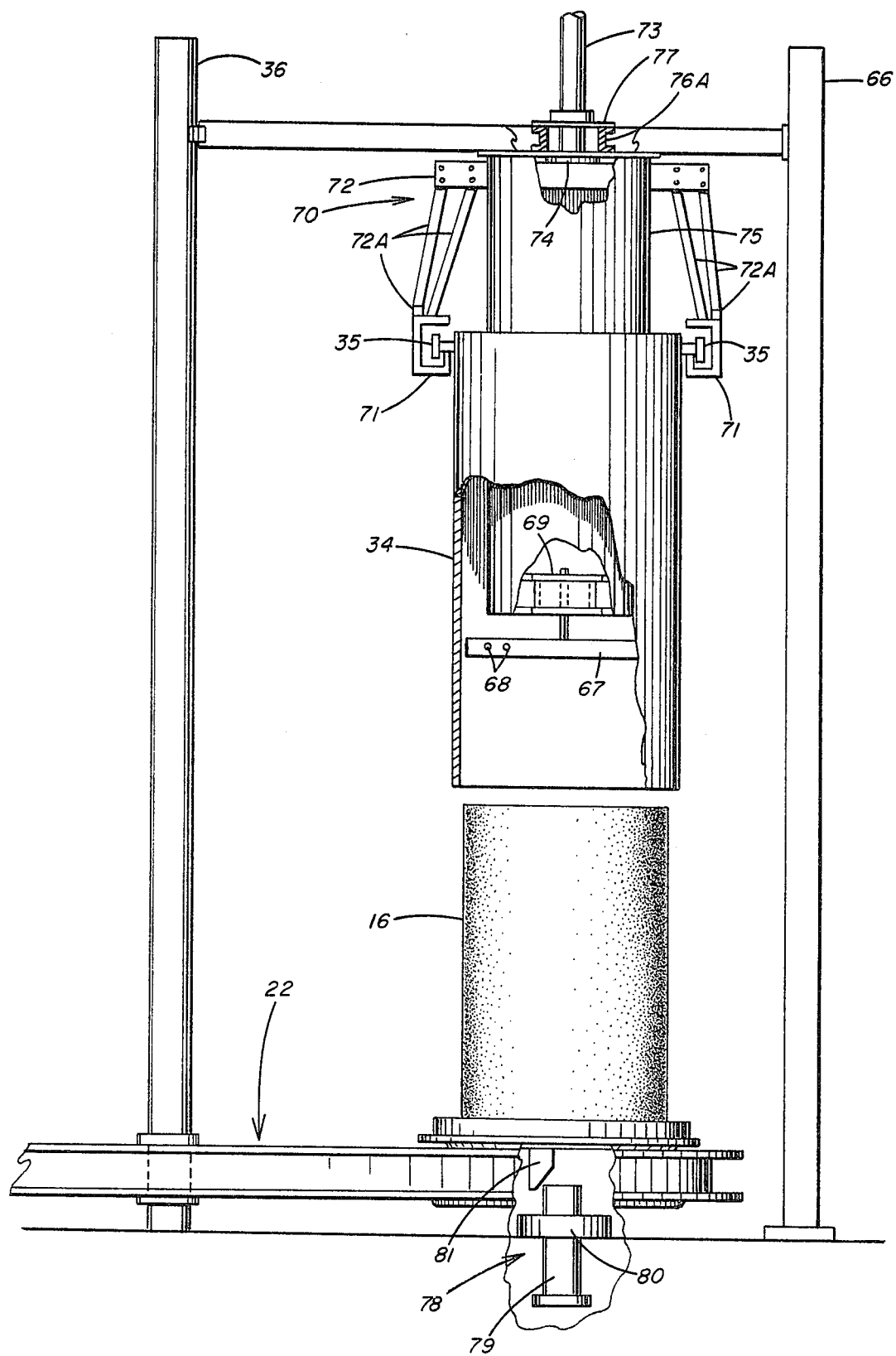
FIG. 7 is a view of the stripping station showing the mold lifted away from the turntable.
Figure 9:
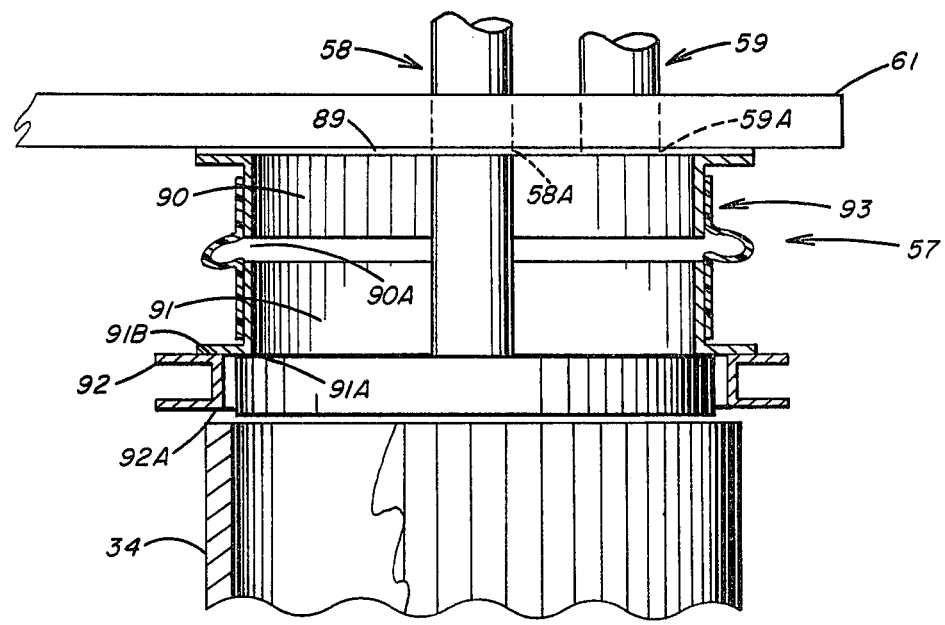
FIG. 9 is an expanded view of the upper steam and gas assembly of the curing or steaming station.

Reference will now be specifically made to FIGS. 2A, 6, 7 and 8. The molds 34 are hollow cylinders. They are preferably made of metal and most preferably stainless steel. They can be of any suitable height and are generally in an area of 5 to 10 feet high. The internal diameter of the molds are such that, when placed over the recesses, they rest on a flat shoulder 85A of the support 85. In general, the thickness of the mold is from 1/8 to 3 inches. Near the upper edge of the mold 34, there are preferably attached T-shaped metal pins 35, which as shown in FIGS. 6 and 7, allow the mold to be lifted away from the turntable. Of course, such pins are not necessary and can be of any suitable shape adapted for any particular lifting mechanism. It would clearly be possible to do completely away with such pins depending on the particular type of lifting means used.

Referring now to FIG. 2A, when the mold rests over the recess, the support 40 will hold it in place, while the seal assembly 42 (shown in detail in FIG. 8) will seal the mold cavity. The mold guide assembly 43 (shown in detail in FIG. 8) will ensure that the mold is properly centered.

FILL STATION

Figure 3:
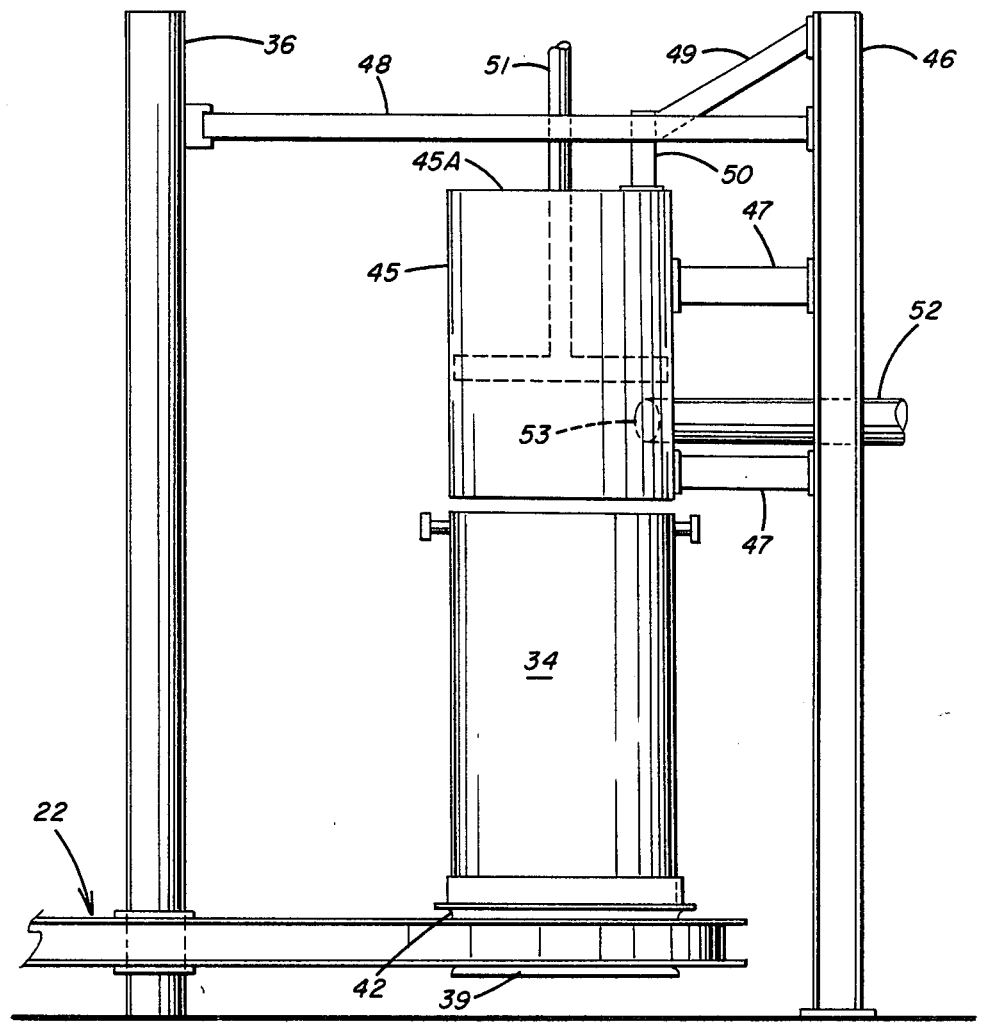
FIG. 3 is a view of the filling station of the apparatus of the invention.
Figure 3A:
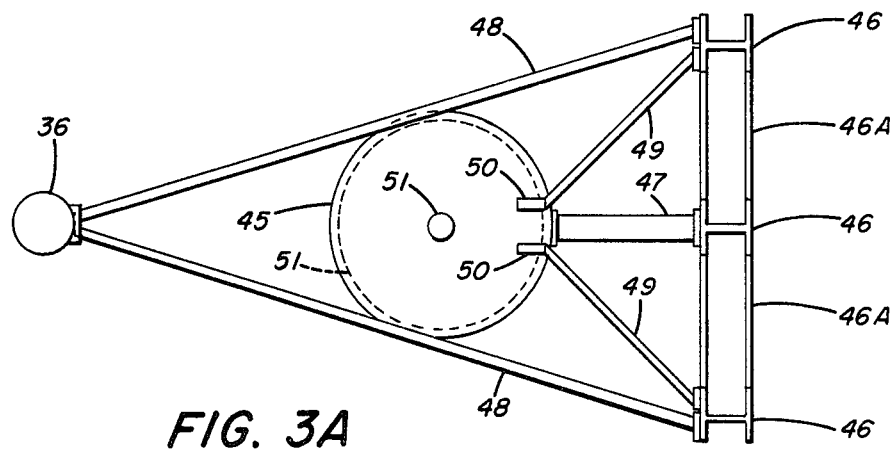
FIG. 3A is a top view of the filling station shown in FIG. 3 illustrating a suitable supporting means.
Figure 4:
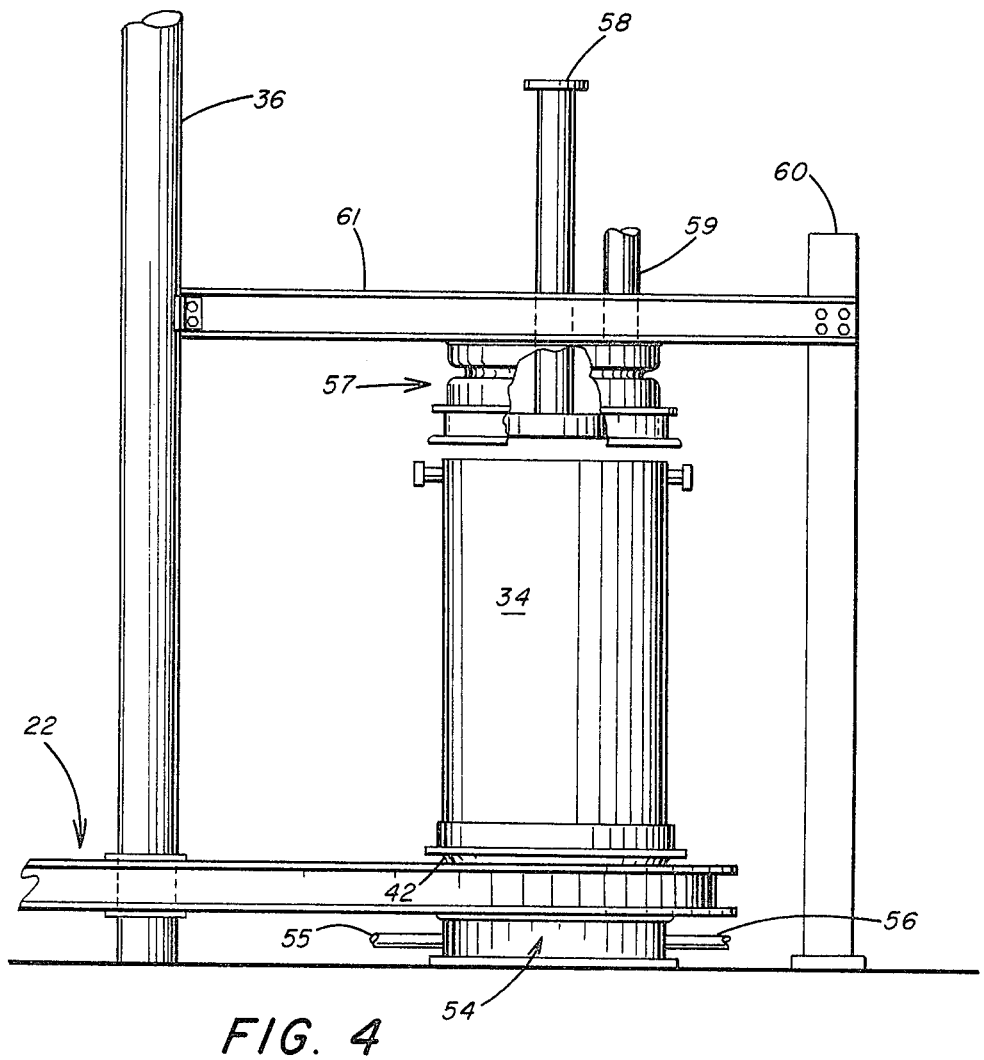
FIG. 4 is a view of the curing or steaming station of the apparatus of the invention.
Figure 4A:
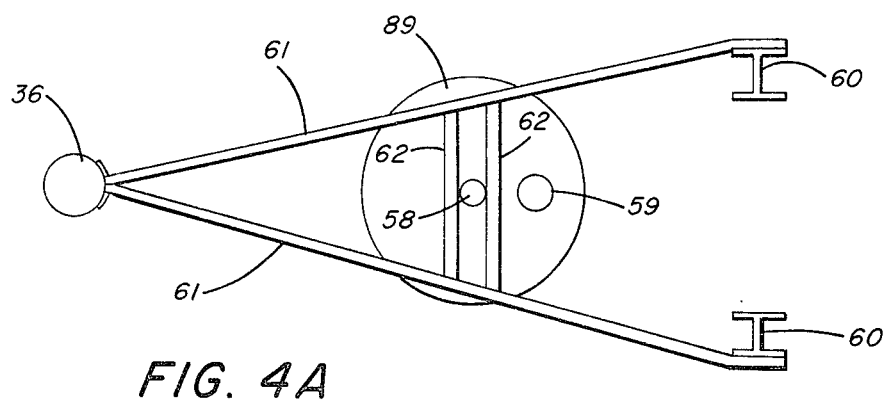
FIG. 4A is a top view of the curing or steaming station shown in FIG. 4 illustrating a suitable supporting means.

Reference will now be made to FIGS. 3 and 3A.

At the fill station, any suitable means is provided for filling the mold with the mixture of the foam particles and binder. In general, it is preferred to introduce the mixture into the mold from above the mold. One useful device is shown in FIG. 3. The device shown in FIG. 3 consists of a hollow drum 45 having a closed upper face 45A and an open lower face. The drum 45 can be fixed to the vertical support 36 via any suitable connecting means. In the device shown (FIGS. 3 and 3A), the suport columns 46 (in the form of I-beams) are securely anchored to the floor. If desired, cross beams 46A may connect the columns 46 for increased rigidity. One or more supporting beams 47 are connected at one end to the center support column 46 and at the other to the drum 45. Two or more support beams 48 can be connected at one end to the outer support columns 46 and at the other end to the vertical support 36. Two or more columns 50 are connected at one end to the closed face 45A of the drum 45 and at the other to supporting trusses 49 which are in turn connected to the outer support columns 46. Clearly, any other suitable arrangement could be used for rigidly supporting the drum 45 and, if desired, for rigidly connecting the drum 45 to the vertical support 36.

The hollow drum 45 is provided with an inlet opening 53 through which the mixture passes via conduit 52. Passing through a hole provided in the closed upper face 45A is a shaft for a hydraulically driven press 51. The support means for the press 51 has not been shown as many arrangements would be readily apparent. The pressing surface of the press 51 passes within the hollow drum 45 and when in operation passes into the mold 34 after the mold has been filled.

As noted above, in a less preferred arrangement, after the mold is filled and the mixture is precompressed, it is possible to pass gas through the bottom of the mold in order to fluff the mixture. This fluffing, whether done at the fill station or at the steam station, is essential to attain uniform densities in the final product. If the fluffing is done at the fill station, means substantially as hereafter described relating to the curing or steam station must be provided beneath the turntable. In this case also, the press surface of the press 51 would have to be porous to allow passage of the air, and suitable venting means would have to be provided. This embodiment is generally not preferred since it would require longer cycle times than when the fluffing step is conducted at the curing station.

In a particularly preferred embodiment, the edge of the lower open face of the drum 45 is provided with a strip of flexible material (not shown) of such a height that when the mold 34 moves under the drum 45, the gap between the lower edge of the drum and the upper edge of the mold is closed so that substantially no foam/binder mixture is lost during the filling step.

For purposes of illustration, the drum 45 may be anywhere from 5 to 15 feet high with an internal diameter substantially equal to the internal diameter of the mold 34.

CURING OR STEAM STATION

Reference will now be specifically made to FIGS. 4, 4A, 8 and 9.

In general, the curing or steaming station must be capable of fluffing the mixture in the mold, compressing the fluffed mixture and curing the binder. In the case where the binder is heat curable, the station should be equipped with a suitable heating means, and/or hot gas source. Depending upon the particular binder used, it is also possible to cure the binder by passing a mixture of inert gas and catalyst through the mold. However, as noted above, it is preferred that the binder be moisture curable. In this case, the curing station should be equipped with a suitable steaming means. Since this is preferred, the invention will now be described for the instance when a steaming step is necessary.

The steam station broadly consists of a lower steam and gas assembly 54, an upper steam and gas assembly 57 and a perforated metal hydraulically driven press 58. The upper assembly may, if desired, be rigidly fixed to the vertical support 36 by any suitable means. In the apparatus shown in FIGS. 4, 4A and 9, two vertical columns 60 (shown as I-beams) are firmly anchored to the floor. Two or more cross beams 61 may then be connected at one end to the vertical columns 60 and at the other end to the vertical support 36. Cross braces 62 may be connected to cross beams 61, if desired and/or necessary. As shown in detail in FIGS. 9 and 4A, a circular plate (preferably metal) 89 is firmly attached to the cross beams 61 and, if desired and/or necessary, to the cross braces 62. The circular plate 89 is provided with two holes 58A and 59A. The shaft of the press 58 passes through hole 58A while hole 59A leads directly to vent 59 (which may be in the form of a metal conduit).

Firmly attached to the outer edge of the lower face of plate 89 is a roll form angle iron 90, (i.e. having an L-shaped cross section). Spaced downward from the open end of angle iron 90 is a second roll form angle iron 91 (also having an L-shaped cross-section). A portion of the lower edge 91A of the second angle iron 91 rests on the upper surface of the press 58. Another portion of the lower edge 91B of the second angle iron 91 is firmly attached to a continuous channel iron 92. Attached to the entire outer circumference of angle irons 90 and 91 is a flexible strip 93 (such as, e.g., rubber). When the press 58 is lowered into the mold 34, the lower edge 92A of the channel iron 92 rests on the upper edge of the mold 34 forming a seal. The flexible strip 93 then acts to seal the gap 90A between the two angle irons 90 and 91. When the press 58 is then lifted out of the mold 34, the upper edge of the press contacts the lower edge 91A of the angle iron 91, thereby lifting the channel iron 92 away from the mold. The press 58 is porous or perforated to allow gas and steam to vent to chimney 59.

As with the fill station, the details of the support for the press and the hydraulic piping has not been shown as both would be readily apparent to one of skill in the art.

As noted above, the steam station also requires a lower steam and gas assembly. This assembly is denoted as 54 in FIGS. 4 and 8. This lower assembly also requires a sealing means 39 which will be hereafter discussed in more detail. The lower steam and gas assembly is located beneath the turntable 22. The lower steam and gas assembly 54 broadly consists of a chamber 54A formed by a continuous channel iron 84 firmly anchored at one end to the ground. This channel iron 84 is provided with two openings 55A and 56A, which act as steam and gas inlets, respectively. In general, it is preferred to utilize air as the gas, although essentially any carrier gas can be used such as nitrogen and the like. In a particularly preferred embodiment, both steam and gas are introduced simultaneously, so that as the fluffing step is started, the binder begins to cure. Steam passes into the chamber 54A via pipe 55 and opening 55A and gas passes into chamber 54A via pipe 56 and opening 56A. In general, the gas and/or steam is blown through the mold bottom at a rate of from 500 to 10,000 cubic feet/minute, and preferably at a rate of 6000 to 7000 ft$^3$/min. These rates are generally used for both the fluffing step and the curing step.

Attached to the upper edge of the internal surface of channel iron 84 is a roll form angle iron 83. Attached to a portion of the upper flat edge of the angle iron 83 is an air flow baffle plate 82. This air flow baffle plate may be of any suitable type generally known in the art. The remaining portion of the upper flat edge of the angle iron 83 and the upper edge of the channel iron 84 have rigidly attached thereto a continuous channel iron 39A. Seated within the channel of channel iron 39A is a seal 39B. Seal 39B is preferably an inflatable seal having elastic memory of a type generally known in the art and is of substantially the same type as seal 42B. In its inflated state, seal 39B presses against the lower surface of channel iron 34A and seals the chamber 54A. Seal 39B is preferably inflatable since a shearing action occurs when the turntable 22 is rotated. Thus, when the steaming step is completed, the seal 39B will be deflated thereby allowing the turntable 22 to rotate freely thereover.

In a less preferred embodiment, as noted before, the fluffing and pressing steps occur at the fill station. In this case, the fill station would have to be provided with a lower and upper gas assembly substantially similar to the lower and upper assemblies for the steam station shown. Obviously, if this embodiment were chosen, there would be no need for the gas inlet shown at the steam station.

DRILLING STATION

As presently contemplated, the apparatus of the invention does preferably utilize a drilling station associated with the turntable. However, it is to be recognized that the drilling step could occur after the molded product is removed from the turntable. Alternatively, thhe mold could be provided with a center mandrel, thereby forming the center hole in situ. Such a center mandrel could be of the type described in U.S. Pat. No. 3,517,414. However, as noted above, it is preferred that the apparatus and process of the invention also includes a drilling station. Reference will accordingly be made to FIGS. 5, 5A, 5B, 5C and 5D to illustrate a preferred drilling station.

Two or more support columns 63 are firmly anchored to the ground. If desired, the columns 63 may be provided with braces to further fix them in position. Four cross beams 64A are rigidly fixed at one end to the support columns 63 with each support column being rigidly connected to two cross beams 64A. If desired, cross braces 64C may also connect sets of cross beams 64A to each other. The other end of the cross beams 64A are rigidly connected to drill track columns 64B, each drill track column being connected to two cross beams 64A. Cross beams 64 may be rigidly fixed at one end to the drill track columns 64B and at the other end to vertical support 36.

Figure 5:
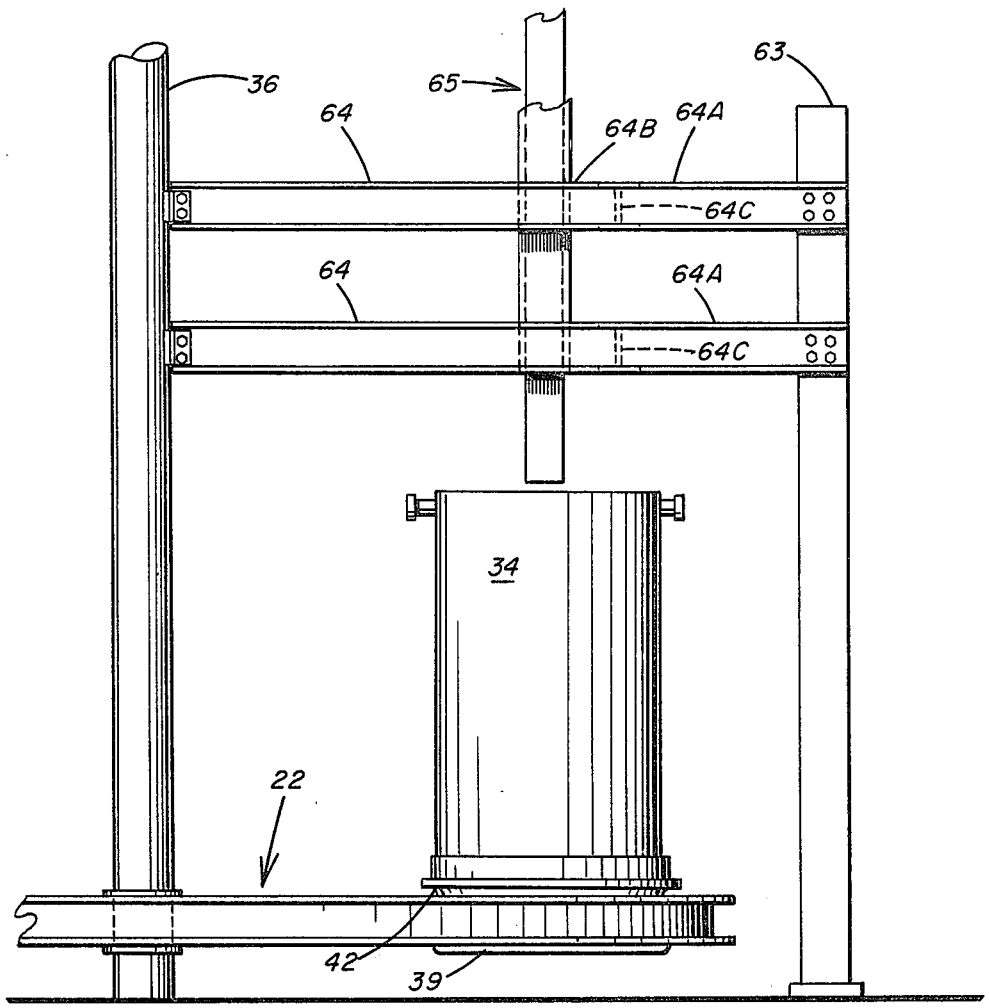
FIG. 5 is a view of the coring or drilling station of the apparatus of the invention.
Figure 5A:
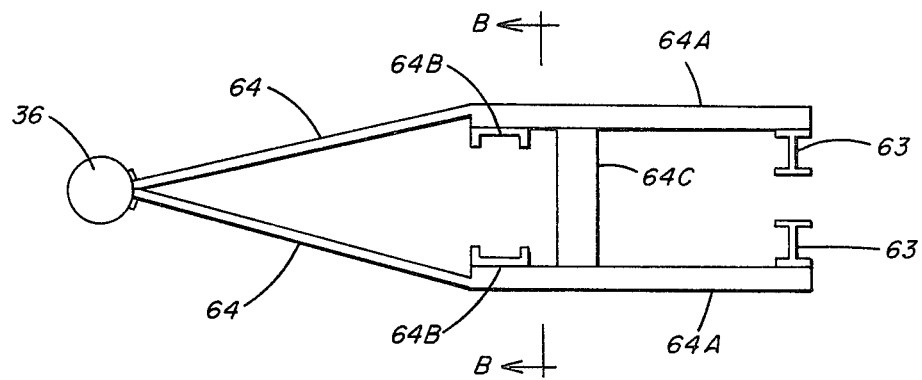
FIG. 5A is a top view of the drill supporting structure shown in FIG. 5 without the drill in place.
Figure 5B:
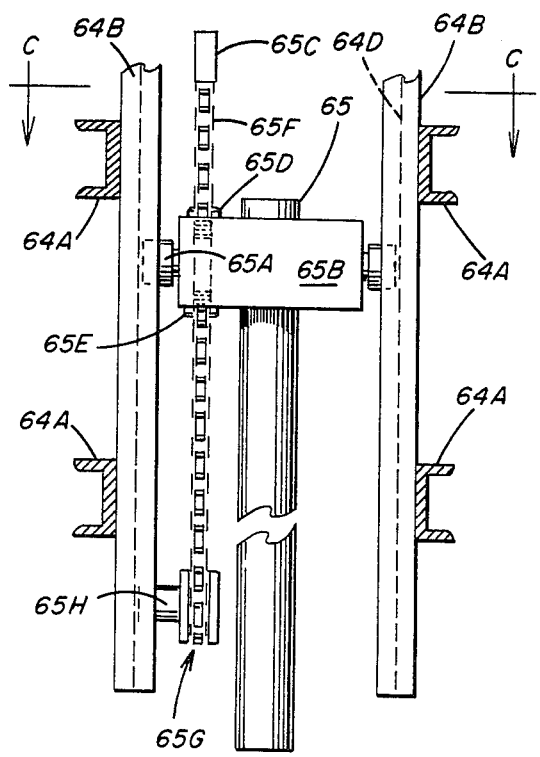
FIG. 5B is a view along line B—B of FIG. 5A but showing the drill in place.
Figure 5C:
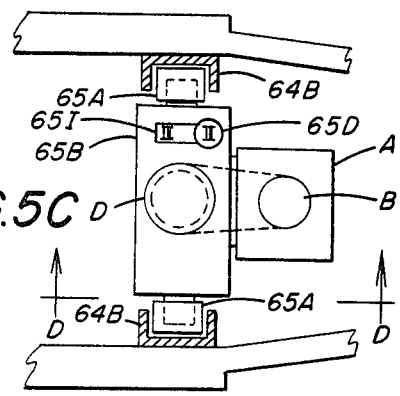
FIG. 5C is a view of FIG. 5B along line C—C.
Figure 5D:
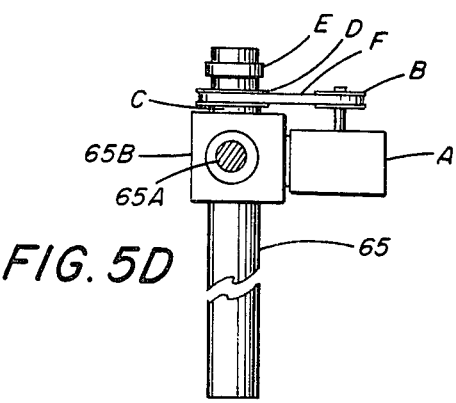
FIG. 5D is a view of FIG. 5C along line D—D.

Referring now specifically to FIGS. 5B, 5C and 5D, which show the drill in place, the drill 65 consists of a drill housing 65B and rollers 65A attached thereto. The rollers 65A allow the drill housing to move up and down in the track 64D of the track column 64B. As shown in FIGS. 5B and 5C, the drill housing 65B is firmly attached to the upper end of the drill 65. The lower end of one of the track columns 64B is provided with a freely rotating sprocket 65G via a suitable connecting means 65H. Above the uppermost reach of the drill 65 is provided a suitably driven sprocket 65C. A chain 65F passes over the sprocket 65C, is firmly connected to the upper surface of the housing 65B at 65D, passes through a channel 65I provided in the housing 65B, passes under the sprocket 65G and is firmly connected to the lower face of the housing 65B at 65E. This mechanism allows the drill 65 to be raised and lowered as desired.

As shown in FIGS. 5C and 5D, the drill 65 is turned via a suitable drive mechanism firmly attached to the drill housing 65B. The driving mechanism in the preferred embodiment consists of an electric gear head motor A. The motor drives a sprocket B which in turn rotates sprocket D rigidly connected to the drill 65 via chain or belt F. Between the sprocket D and the housing 65B is a bearing C which allows the sprocket to freely rotate. A jamb nut E is provided on the upper most end of the drill to lock the sprocket to the drill.

The driving means for sprocket 65C and the details of the electric gear head motor have not been shown since many varieties of such would be readily apparent to one skilled in the art.

STRIPPING STATION

Reference will now be made to FIGS. 6, 6A, 6B, 7, 11, 11A, 12, 14, 14A and 15.

Essentially any means may be provided for lifting the mold 34 over the final molded product. One particularly preferred means is that shown in FIGS. 6, 6A, 6B and 7. Two or more lifting support columns 66 are firmly anchored to the ground. Two support beams 76 are then firmly attached at one end to the lifting support column and may be attached at the other end to the vertical support 36. Attached to the under surfaces of support beams 76 is a circular plate 75A which is rigidly secured to one open end of hollow drum 75. Two cross braces 76A are rigidly fixed to the circular plate 75A and to the support beams 76. A plate 77 is then rigidly fixed to the top of cross braces 76A. Two or more additional braces 77A may, if desired, be connected to the plate 75A and the plate 77. Both the plate 75A and the plate 77 are provided with a hole through which will pass the shaft of a hydraulic lifting mechanism 73.

The shaft of the hydraulic lift mechanism passes through the hollow drum 75 and is rigidly connected at its end to plate 74 of the lifting assembly 70. As shown in FIGS. 6 and 6A, the lifting assembly 70 consists of a lift bar or bars 72 firmly attached to the under side of plate 74. If desired, suitable cross braces 72B may be used to rigidify lift bars 72. The ends of the lift bars are connected via suitable bracing means 72A to gripping fingers 71. Gripping fingers 71 are of such a configuration that when a mold rotates to the stripping station, the fingers are in position to lift the mold via grips 35. The drum 75 is provided with slots (not shown) so that when the hydraulic lift 73 lifts the mold 34, the lift bars 72 can freely move up through the drum 75. Additionally, the outer diameter of the drum 75 is such that the mold 34, in its lifted position, will pass around the outside the drum (see FIG. 7).

Figure 11:
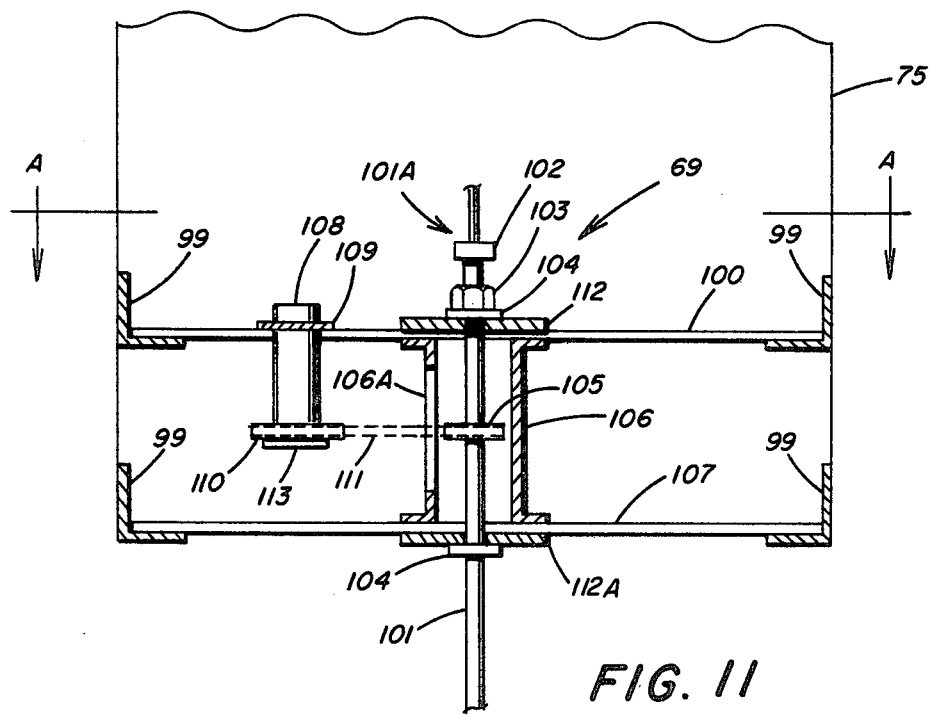
FIG. 11 is an expanded view of the driving mechanism for the brush assembly at the stripping station.
Figure 11A:
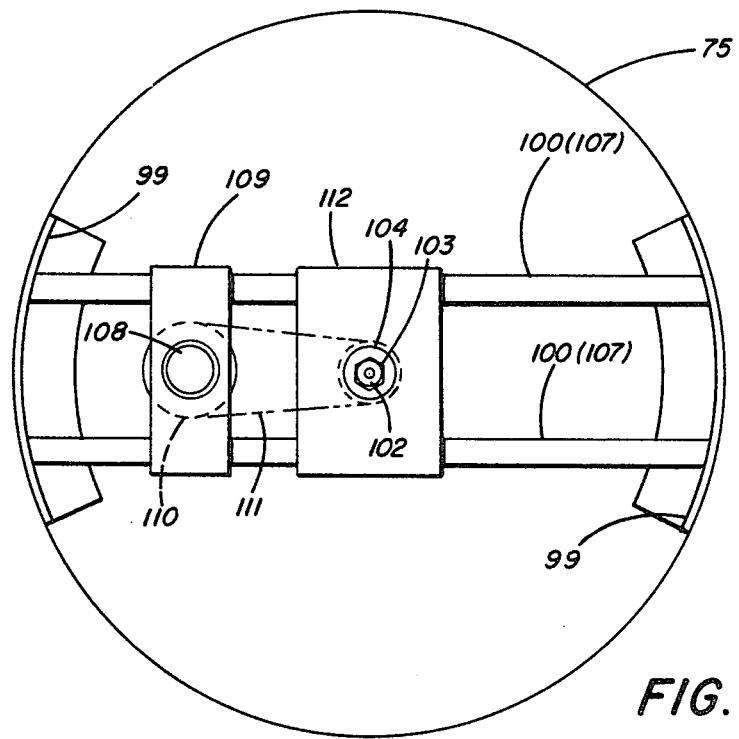
FIG. 11A is a view of FIG. 10 taken along line A—A.
Figure 13:
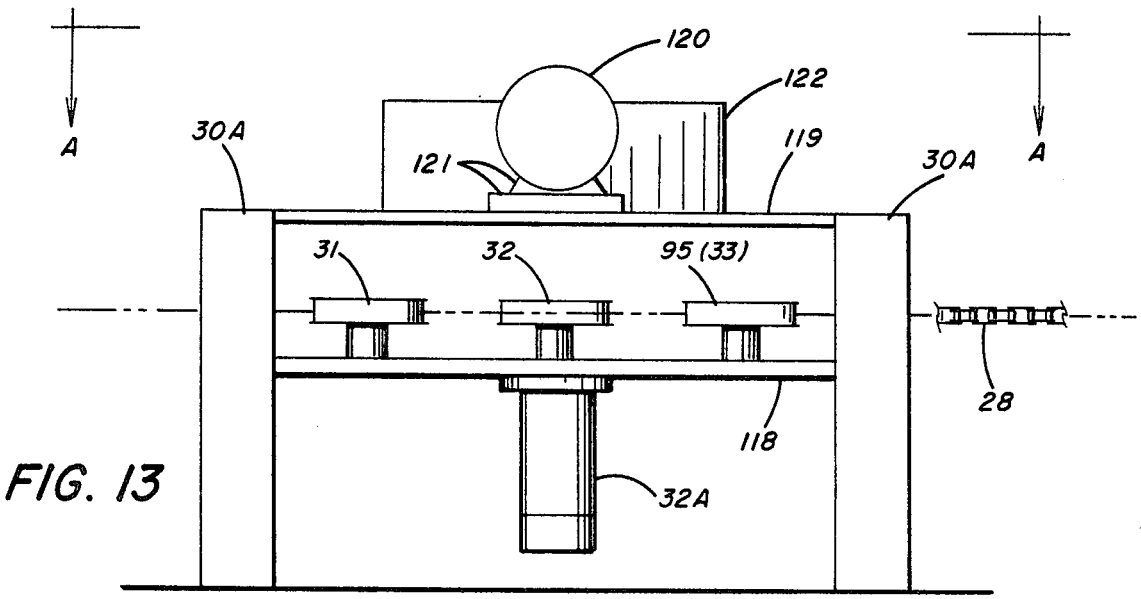
FIG. 13 is a side view of the driving means for the turntable and of a preferred turntable locking means.
Figure 13A:
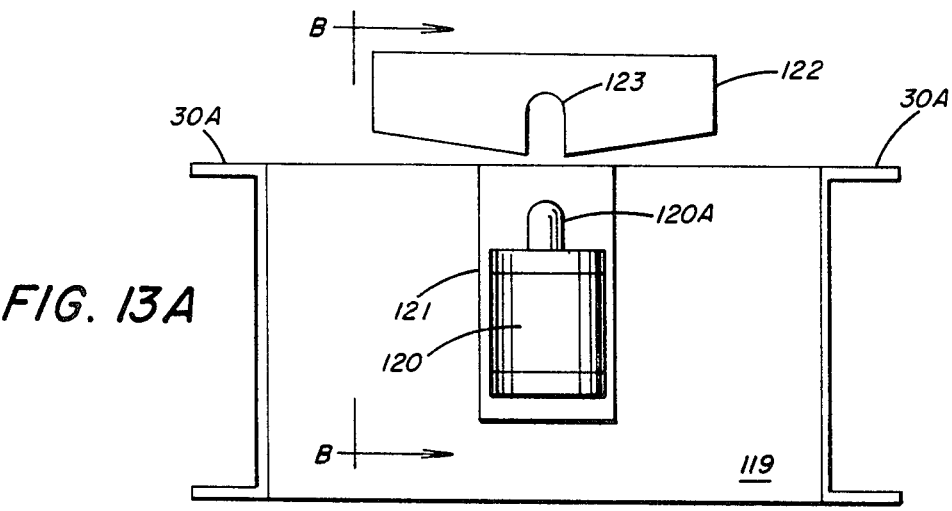
FIG. 13A is a view of FIG. 13 taken along line A—A.
Figure 13B:
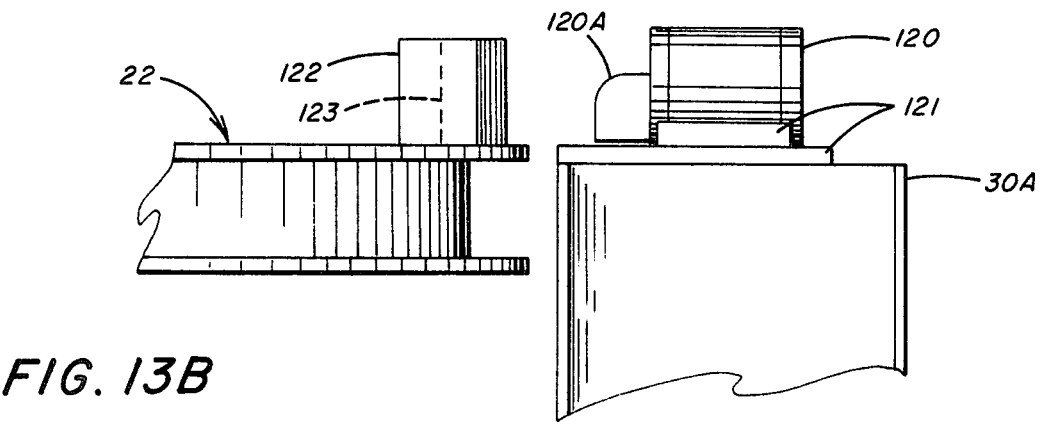
FIG. 13B is a view of FIG. 13A taken along line B—B.

In a particularly preferred embodiment, the stripping station is constructed so that the internal surface of the mold may be cleaned and/or coated with mold release agent as the mold is lifted away from the turntable. This expedient is achieved by the following means referring to FIGS. 6, 11 and 11A. The bottom of the drum 75 has attached thereto four angle brackets 99 as shown in FIG. 11. Firmly attached to each set of brackets 99 are two cross supports 100 and 107. Attached to the upper surface of cross support 100 is plate 112 having a hole therein. Attached to the upper surface of cross supports 107 is plate 112A having a hole therein. The plates 112 and 112A may be further anchored in place via columns 106 and 106A running between the cross supports 100 and 107 and connecting plate 112 to plate 112A. The holes provided in plates 112 and 112A are adapted to receive and guide a rotating shaft 101. The shaft 101 has attached thereto a rotary brush 67 which acts to clean the internal mold surface. Additionally, the rotary brush or a suitable rotating device may be provided with holes 68 lead to the inside of the shaft 101 through which mold release agent may be fed via line 101A. The shaft 101 is locked in place via rotating joint 102, jamb nut 103 and bearings 104. The drive assembly 69 for the shaft 101 is driven via a suitable mounted driven sprocket 105 which is connected via chain 111 to a driving sprocket 110. The structure designated 113 is similar in structure to parts 102, 103 and 104. The driving sprocket 110 is driven via suitable driving means (preferably a hydraulic motor) 108 which is mounted to cross supports 100 via plate 109. The specific details of the hydraulic piping and specific piping for the mold release agent have not been shown in detail as many different varieties are possible and apparent. The configuration shown in FIG. 6 has an added benefit that since the rotary brush 67 is not free to move vertically, as the mold 34 is lifted, if the molded product sticks to the inside of the mold, the brush 67 will act as a press and actually press the product out of the mold.

Figure 12:
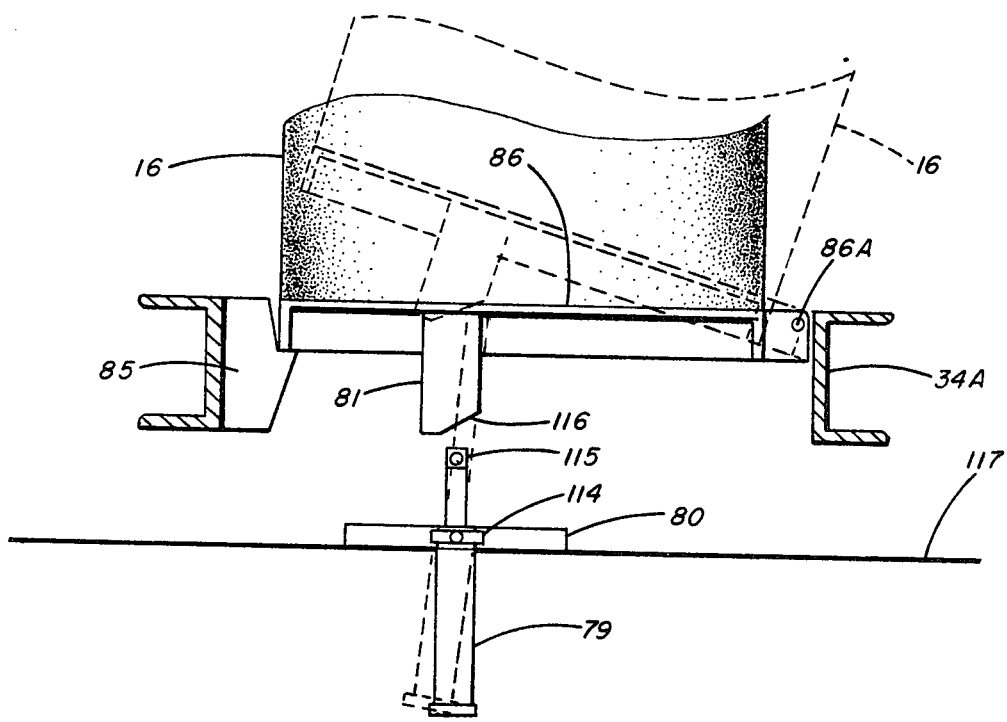
FIG. 12 is an expanded view of a preferred ejection means for use in the stripping station.

In yet another particularly preferred embodiment, the stripping station is provided with a means to actually eject the molded product from the top surface of the turntable. Of course, it is possible to manually remove the molded product. But the presently preferred means is the ejection system 78 shown in FIGS. 6, 7, and 12. As shown in FIGS. 8 and 12, the screen 86 is provided with a hinge 86A which is fixed to the channel iron 34A. Referred to FIGS. 14, 14A and 15, four metal bars 86B are rigidly connected to the internal surface of channel iron 34A. The bars 86B are provided with holes 86C adapted to lock the screen in place. One suitable locking means is that shown in FIG. 15. Two cross bars 125 are braced with braces 126 and are firmly attached to the upper surface of the screen 86 (not shown in FIG. 15). The outer extension of bars 127 is adapted to fit between the gaps formed by each set of bars 86B. Bolt nut assemblies 127 are then used to lock the screen at the pivot point. This hinge 86A allows the screen 86 to be lifted out of the recess (see dotted lines in FIG. 12). In the embodiment shown in FIGS. 6, 7 and 12, the bottom of screen 86 is provided with a cam 81 having a cam track 116 therein. The cam 81 may be fixed to the bottom of the screen 86 via two cross bars (not shown). Below the turntable and actually below the ground level 117 is placed a hydraulic piston 79. The piston 79 is mounted in a housing 80 (which is firmly anchored to the ground) via a trunnion mount 114. The outer end of the piston is provided with a cam follower 115 which engages the cam track 116. When the piston 79 is activated by feeding hydraulic fluid through the bottom thereof, the cam follower 115 engages the cam track 116 and lifts the screen 86 out of the recess with hinge 86A acting as a pivot. The molded product then falls away from the turntable.

OPERATION

The operation of the apparatus of the equipment shown will be discussed, particularly with reference to FIGS. 3, 4, 5, 6, 7, 8, 9 and 12.

The turntable 22 is moved to a position such that a recess with a mold 34 therein is transported to the filling station. The air inflatable seals 42B (FIG. 8) are inflated to block the escape of foam/binder mixture from around the base of the mold. The foam/binder mixture is then passed into the hollow drum 45 via inlet 53 and passes into the mold 34. The mold is filled with a predetermined amount of mixture. Once the full amount of foam mixture is introduced, the amount of material in the mold is actually above the upper level of the mold. The mixture is then precompressed by the hydraulically driven press 51. The press 51 is allowed to dwell in the mold for a time sufficient (generally from 5 to 60 seconds) to allow the filled mold to be transported to the curing or steam station without the foam mixture flowing over the sides of the mold 34. The press 51 is then withdrawn from the mold, and the inflatable seals 42B are deflated. The mold is then transported to the steam station.

At the steam station, air inflatable seals 39B and 42B (FIG. 8) blocking the escape of steam and gas as the mold is steamed are inflated. The press 58 is then lowered just to the upper surface of the mold so that the channel iron 92 rests on the upper edge of the mold 34 (alternatively, the lower edge of the channel iron 92 could be provided with a strip of flexible material in order to seal the gap between the lower edge of channel iron 92 and the upper edge of the mold 34) in order to prevent foam loss during the fluffing step. For a predetermined amount of time (generally from 5 to 15 seconds) only gas, or in the preferred embodiment moist gas (which is preferably a mixture of air and steam) is passed through the foam/binder mixture via inlet 56A and chamber 54A to fluff the mixture, thereby ensuing uniform density in the final product. The foam/binder mixture is then compressed by hydraulically operated press 58. If such has not already taken place, as the press 58 is lowered, the channel iron 92 also lowers to rest on the upper edge of the mold 34. Steam is passed through inlet 55A and through the bottom of the mold 34 and out through vent 59 for a predetermined amount of time (generally from 3 to 7 minutes or higher) in order to fully cure the binder. Upon completion of the steaming step, the press 58 is withdrawn from the mold 34, thereby lifting channel iron 92 away from the mold 34, and the inflatable seals 39B and 42B are deflated. The steaming step is complete and the mold can be transported to the next station. It should be noted that as the steaming step is being conducted, a new mold is being filled at the filling station, so that when the steamed mold is moved to the next station, simultaneously a filled mold is transported to the steam station.

As noted above, although not necessary, it is preferred to include a drilling station in the apparatus of the invention. In the absence of a drilling station, the steamed mold would be transported directly to the stripping station. Assuming, however, that a drilling station is present, the steamed mold would then be transported thereto. At the same time, molds are being transported to the filling and steaming stations. At the drilling station, the drill 65, which is preferably in the form of a hollow coring device, lowers into the cured product. After travelling the full depth of the molded product, the drill 65 is raised. If desired, means (not shown) may be provided to spray the outside surface of the drill with a suitable release agent as it emerges from the cured product. In general, the hollow coring devices available are capable of ejecting the drill core, e.g. with compressed air. The drilling step is now complete and the mold is then transported to the stripping station. As the drilling step is being conducted, filling and steaming operations are also being conducted. Similarly, when the mold is transported from the drilling station to the stripping station, molds are simultaneously being transported to the filling, steaming and drilling stations.

At the stripping station, the mold 34 passes into a position such that the gripping means 71 can grip the T-shaped metal pins 35 when the lifting assembly is activated. Once the assembly is activated, the hydraulic lift 73 lifts the mold 34 away from the turntable 22, allowing the cured product to slide out the bottom of the mold 34. The mold 34 is lifted up to a sufficient height to allow the cured product to be removed. When a cleaning device and/or mold release application device is used, the driving means of such device is activated as the lifting assembly lifts the mold. When a brush 67 is used, the brush cleans the internal surface of the mold. If desired, mold release agents may be simultaneously applied to the internal surface of the mold via orifices 68 in the rotary brush 67. Of course, if no brush is used, a rotary disc can be used to apply the mold release.

The cured product is then removed from the turntable 22 either manually or via the ejecting means 78 described above under the section entitled STRIPPING STATION. The hydraulic lift is then lowered so that the mold 34 once again sits over the recess in the turntable. The empty mold is then transported by rotating the turntable to the filling station. Simultaneously with the transporting of the empty mold to the filling station, a mold is transported from the filling station to the steaming station, a mold is transported from the steaming station to the drilling station, and a mold is transported from the drilling station to the stripping station. Again, as one mold is being stripped at the stripping station, the operative steps at the filling, steaming and drilling stations are being conducted.

In general, the times necessary for completion of the various steps may be varied over a wide range. The turntable may be rotated so that a mold is moved to each station (i.e., the time to complete one quarter revolution) in from 10 to 30 seconds or more, and preferably in about 15 seconds. If the turntable is rotated too rapidly, of course, the molds could fall over. The filling function can generally take anywhere from 3 minutes to 5 minutes or more, with the actual filling step taking from 2 to 4 minutes or more and the pressing step (including lowering, dwelling and raising of the press) taking from 1 to 3 minutes or more. The steaming function can generally take anywhere from 3 to 7 minutes or more, with the fluffing step taking from 5 to 20 seconds, and the steaming and pressing steps (including lowering, dwell and lifting of the press) taking a total time of from about 3 minutes to 6 or more minutes. The drilling function can take anywhere from 1 to 2 minutes or more. The stripping function can take anywhere from just over 1 minute to 5 or more minutes. In general, it takes from 30 seconds to 2 minutes to lift the mold away. The lifted mold is kept in place for from 15 to 45 seconds, and the mold is lowered in place in from 30 seconds to 2 minutes. When used, the cleaning and mold release spraying function can be completed in from 30 seconds to 2 minutes, depending on the speed with which the mold is lifted away. The ejection, if used, will generally take from 10 to 40 seconds. Thus, the total cycle time for a mold to rotate completely through the fill station, the steam station, the drilling station, the stripping station and back to the filling station will generally range anywhere from about 8 minutes to 21 minutes or more and preferably will take about 15 minutes.

All the various process steps can be controlled in any suitable manner. For example, each function could be individually controlled via suitable electrical control means. It is preferred, however, that all the various functions be programmed into a single control unit in substantially any known manner. A particularly preferred system is one commercially available from Texas Instruments knowns as 5TI Programmable Control System and, specifically, the system known as 5TI-1023. The particular control means selected is, of course, not critical, and in fact need not be used. If desired, a further control can be added. Thus, e.g. in FIG. 2, an electric eye 26 is mounted adjacent to the turntable between the filling and stripping stations. As electric receiver 27 is then mounted adjacent to the turntable between the stripping and drilling station. If no mold or product is present in the lowered position at the stripping station, the control may be programmed to activate the mold lowering means.

The invention is further illustrated, but is not intended to be limited by the following example in which all parts and percentages are by weight unless otherwise specified.

EXAMPLE

An apparatus as described herein was used for a 16 hour period. The pertinent dimensions were as follows:
Turntable size—about 15 feet in diameter,
Mold diameter—internal—5 feet,
Screen (86) diameter—5 feet,
Mold height—8 feet,
Fill station drum (45)-height-10½ feet,
Fill station drum (45)-internal diameter—5 feet
Strip station drum (75)-height—10 feet.

Inflatable seals 42B (G-12 seal from Seal Master Corporation) were inflated. A mixture of 500 parts by weight of foam particles and 50 parts by weight of a tolylene diisocyanate-based prepolymer were fed to drum 45 in three minutes. The press 51 took 30 seconds to lower to a height of 76 inches in the mold 34, was allowed to dwell on the foam mixture for 5 seconds and took 60 seconds to be raised out of the mold 34. The seals 42B were then deflated.

At the steaming station, the seals 42B and 39B (also G-12 seals from Seal Master Corporation) were inflated. Air was blown through the bottom of the mold for a period of 10 seconds at a rate of about 6500 $ft^3$/min. using a 20 horsepower Carolina blower. Thereafter steam at a pressure of 30 psi was mixed with the air and the press 58 was lowered to a height of 76 inches in the mold. The total steaming/pressing time (including lowering, dwelling and lifting) was about 4.5 minutes. The seals 42B and 39B were then deflated. The drilling operation utilized a commercially available hollow coring device and took 85 seconds to complete.

The lifting of the mold took 60 seconds. The molded product was manually removed from the turntable surface, with the mold 34 staying in the lift position for 25 seconds. The lift assembly then lowered the mold onto the turntable in 60 seconds. A cleaning brush and mold release spray as shown in FIG. 6 were used and were activated 5 seconds after the mold began to be lifted away and were driven using a Char-Lynn Orbit motor. The mold release was applied for 55 seconds and the brush rotated for 80 seconds.

The rotating speed of the turntable to allow a mold to arrive at each station was 15 seconds. The turntable was driven via a driving assembly 29 driven by a Char-Lynn Orbit hydraulic motor.

All the process functions were controlled using a 5TI-1023 control system (Texas Instruments).

After a period of 16 hours, 120 rebonded foam cylinders were produced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of rebonded foam comprising (A) filling a mold at a first station with a mixture of foam particles and binder and thereafter precompressing said mixture in said mold,
(B) transporting a filled mold to a second station,
(C) at said second station,
   (i) passing gas through the bottom of said filled mold in order to fluff the mixture,
   (ii) compressing the fluffed mixture, and
   (iii) curing said binder while said mixture is in the compressed state, thereby forming a cured product,
(D) transporting a mold containing cured product to a third station,
(E) at said third station,
   (i) lifting said mold away from the cured product,
   (ii) removing said cured product from under said mold, and
   (iii) lowering the empty mold, and
(F) transporting said empty mold to said first station, wherein the operation of steps (A), (C) and (E) occurs substantially simultaneously, and wherein the transporting steps of (B), (D), and (F) occur simultaneously.

2. The process of claim 1 wherein said particles are polyurethane foam particles and wherein said binder is moisture curable.

3. The process of claim 2 wherein said binder is an isocyanate terminated prepolymer.

4. The process of claim 1 wherein said curing comprises passing moist gas through the bottom of said filled mold for a time sufficient to cure the binder.

5. The process of claim 4 wherein said gas is air and said moist gas is a mixture of air and steam.

6. The process of claim 1, wherein after step (C) and before step (D),
(G) said mold containing cured product is transported to a fourth station, and
(H) at said fourth station, a hole is drilled vertically through said cured product, and wherein the operation of steps (A), (C), (E) and (H) occurs substantially simultaneously and wherein the transporting steps of (B), (D), (F) and (G) occur simultaneously.

7. The process of claim 6, wherein step (E) further comprises the step of cleaning the internal surface of the mold as the mold is lifted away from the cured product.

8. The process of claim 6, wherein step (E) further comprises the step of applying a mold release agent to the internal surface of the mold as the mold is lifted away from the cured product.

9. The process of claim 8, wherein step (E) further comprises the step of cleaning the internal surface of the mold as the mold is lifted away from the cured product.

10. The process of claim 1, wherein step (E) further comprises the step of cleaning the internal surface of the mold as the mold is lifted away from the cured product.

11. The process of claim 1, wherein step (E) further comprises the step of applying a mold release agent to the internal surface of the mold as the mold is lifted away from the cured product.

12. The process of claim 11, wherein step (E) further comprises the step of cleaning the internal surface of the mold as the mold is lifted away from the cured product.

13. The process of claim 1, wherein the gas used in step (C) (i) is moist gas.

14. The process of claim 13, wherein the gas used in step (C) (i) is a mixture of air and stream.

15. A process for the production of rebonded foam comprising (A) at a first station,
   (i) filling a mold with a mixture of foam particles and binder,
   (ii) compressing said mixture in said mold, and releasing the compression,
   (iii) passing air through the bottom of said mold in order to fluff the mixture,
   (iv) compressing said mixture in said mold,
(B) transporting a filled mold to a second station,
(C) at said second station, curing said binder thereby forming a cured product,
(D) transporting a mold containing cured product to a third station,
(E) at said third station,
   (i) lifting said mold away from the cured product,
   (ii) removing said cured product from under said mold, and
   (iii) lowering the empty mold, and
(F) transporting said empty mold to said first station, wherein the operation of steps (A), (C) and (E) occurs substantially simultaneously, and wherein the transporting steps of (B), (D) and (F) occur simultaneously.

16. The process of claim 15 wherein said curing comprises passing moist gas through the bottom of said filled mold.

17. The process of claim 15, wherein after step (C) and before step (D),
(G) said mold containing cured product is transported to a fourth station, and
(H) at said fourth station, a hole is drilled vertically through said cured product, and wherein the operation of steps (A), (C), (E) and (H) occurs substantially simultaneously and wherein the transporting steps of (B), (D), (F) and (G) occur simultaneously.

18. The process of claim 17, wherein step (E) further comprises the step of cleaning the internal surface of the mold as the mold is lifted away from the cured product.

19. The process of claim 17, wherein step (E) further comprises the step of applying a mold release agent to the internal surface of the mold as the mold is lifted away from the cured product.

20. The process of claim 19, wherein step (E) further comprises the step of cleaning the internal surface of the mold as the mold is lifted away from the cured product.

21. An apparatus for the production of rebonded foam comprising
(A) a turntable having a plurality of recesses therein, each recess adapted to receive a cylindrical mold,
(B) a plurality of cylindrical molds,
(C) a driving means for rotating said turntable around a vertical support, said vertical support located in the center of said turntable,
(D) a first station located above said turntable for filling a mold with a mixture of foam particles and binder when one of said molds set in said recesses is located thereunder, said first station comprising
   (i) a means for filling a mold with said mixture, and
   (ii) a first pressing means for precompressing said mixture in said mold,
(E) a second station for curing said mixture in said mold when one of said molds set in said recesses is located thereat, said second station comprising
   (i) a means for blowing gas through the bottom of the recess located at said second station and through the bottom of a filled mold, (ii) a second pressing means located above said turntable for compressing said mixture in said mold, and (iii) a means for curing said binder, (F) a third station located above said turntable for removing a mold from said turntable, said third station being operative when one of said molds set in said recesses is located thereunder, and comprising (i) a lifting means for lifting a mold located on said turntable away from said turntable, and (ii) a lowering means for lowering a mold into a recess of said turntable, wherein the location of said molds set in said recesses in said turntable is such that when a recess is located at any one station, a recess is located at each station.

22. The apparatus of claim 21, wherein said curing means comprises a means for blowing moist gas through the bottom of the recess located at said second station and through the bottom of said filled mold.

23. The apparatus of claim 21, wherein said first, second and third stations are structurally connected to said vertical support.

24. The apparatus of claim 21, wherein after said second station and before said third station, a fourth station is positioned, said fourth station located above said turntable and comprising a drilling means for drilling a hole vertically through the center of the mold cavity of a mold when one of said recesses is located under said fourth station, wherein when a recess is located at the first, second and third station, a recess is located at the fourth station.

25. The apparatus of claim 24 wherein said fourth station is structurally connected to said vertical support.

26. The apparatus of claim 24, wherein said third station further comprises a cleaning means associated with said lifting means for cleaning the internal surface of a mold.

27. The apparatus of claim 24, wherein said third station further comprises a means for applying a mold release agent to the internal surface of a mold, said applying means being associated with said lifting means.

28. The apparatus of claim 27, wherein said third station further comprises a cleaning means associated with said lifting means for cleaning the internal surface of a mold.

29. The apparatus of claim 21, wherein said third station further comprises a cleaning means associated with said lifting means for cleaning the internal surface of a mold.

30. The apparatus of claim 21, wherein said third station further comprises a means for applying a mold release agent to the internal surface of a mold, said applying means being associated with said lifting means.

31. The apparatus of claim 30, wherein said third station further comprises a cleaning means associated with said lifting means for cleaning the internal surface of a mold.

32. The apparatus of claim 21, wherein the outer edge of said turntable rests on rollers which allow the turntable to rotate around said vertical support.

33. The apparatus of claim 32, wherein said rollers are suspended over the ground via fixed supports which are anchored to the ground.

34. The apparatus of claim 21, wherein each recess is a circular recess provided with a plurality of supporting means adapted to support the lower face of a cylindrical mold and further adapted to support a screen below the lower face of said cylindrical mold.

35. The apparatus of claim 34, wherein each recess is provided with a sealing means for sealing a mold resting on said supporting means.

36. The apparatus of claim 35, wherein said sealing means comprises an inflatable seal.

37. The apparatus of claim 34, wherein each recess is provided with a guiding means for ensuring that a mold is centered thereover.

38. The apparatus of claim 21, wherein said driving means comprises a sprocket and chain drive system, driven via a hydraulic motor.

39. The apparatus of claim 30, wherein said chain passes over the entire circumference of said turntable, over an idler sprocket, over a drive sprocket and over a chain tightening sprocket, said drive sprocket driven via a hydraulic motor.

40. The apparatus of claim 39, wherein said circumference is provided with a plurality of fixed sprockets over which the chain passes.

41. The apparatus of claim 21, wherein (a) said filling means comprises a hollow cylinder, located above the turntable, closed at one face and open at the other, which said closed face is fixed to a supporting structure which is rigidly connected to said vertical support and wherein said open face corresponds to the location, shape and size of a mold thereunder, said hollow cylinder having an opening in one of the surfaces thereof for introduction of said mixture into said mold, and (b) said first pressing means comprises a hydraulically driven press located within said hollow cylinder above said opening, the shaft of said press passing through the said closed face, and wherein said press is adapted to pass through said hollow cylinder and into a mold located thereunder.

42. The apparatus of claim 41, wherein the open face of said hollow cylinder is provided with sealing means such that when a mold is positioned beneath said hollow cylinder, substantially no mixture will escape during the filling of the mold.

43. The apparatus of claim 22, wherein said means for blowing gas (E) (i) and said curing means (E) (iii) include a chamber formed beneath said turntable, said chamber having inlets for both air and moist air and being provided with a sealing means for sealing said chamber when one of said recesses is positioned thereabove.

44. The apparatus of claim 43, wherein said second pressing means (E) (ii) comprises (A) a first cylindrical bracket rigidly connected to a supporting structure which is rigidly connected to said vertical support, (B) a second cylindrical bracket spaced from said first cylindrical bracket, (C) a hydraulically driven press, having a porous pressing surface, the pressing surface of which passes through the cylindrical spaces formed by said first and second cylindrical brackets, the lower edge of said second cylindrical bracket resting on the upper surface of said press, said press adapted to pass through said cylindrical spaces and into a mold located thereunder, said lower edge adapted to rest on the outer edge of a mold when the press passes into such mold, (D) a flexible sealing means attached to the outer surfaces of said first and second cylindrical brackets and adapted to seal the cylindrical space formed by said brackets thereby forming an upper chamber which is provided with a venting means for venting gasses passed upward through the mixture.

45. The apparatus of claim 21, wherein said lifting and lowering means comprises
 (A) a gripping means for gripping the outer surface of a mold, said gripping means connected to a lifting bar,
 (B) a hydraulically activated lifting cylinder, the lower end of which is connected to said lifting bar.

46. The apparatus of claim 45, wherein said lifting and lowering means further comprises
 (C) a hollow cylinder, located above the turntable, closed at one end and open at the other, wherein said closed end is fixed to a supporting structure which is rigidly connected to said vertical support, and wherein said lifting bar is adapted to pass up through said hollow cylinder when the hydraulically activated lifting cylinder is moved upward.

47. The apparatus of claim 46, wherein the open end of said hollow cylinder has fixed thereto a cleaning device, a mold release application device, or both types of devices.

48. The apparatus of claim 47, wherein said cleaning device comprises a rotary brush attached to a drive shaft driven via a hydraulic motor, and wherein said cleaning device is adapted to rotate in a fixed position as the lifting means removes a mold.

49. The apparatus of claim 48, wherein said rotary brush is provided with orifices therein, such that a mold release agent may be passed through the drive shaft and through said orifices.

50. The apparatus of claim 21, wherein each recess is provided with a screen resting therein.

51. The apparatus of claim 50, wherein each screen is provided with a cam rigidly fixed to the lower surface thereof.

52. The apparatus of claim 51, wherein said third station additionally comprises a molded product ejecting means, said ejecting means comprising a hydraulic piston located beneath said turntable, said piston adapted to push against said cam, thereby causing the molded product to fall away from the turntable.

53. An apparatus for the production of polyurethane foam comprising
 (A) a turntable having a plurality of recesses therein, each recess adapted to receive a cylindrical mold,
 (B) a plurality of cylindrical molds,
 (C) a driving means for rotating said turntable around a vertical support, said vertical support located in the center of said turntable, (D) a first station located above said turntable for filling a mold with a mixture of shredded foam particles and binder when one of said mold set in said recesses is located thereunder, said first station comprising
  (i) a means for filling a mold with said mixture,
  (ii) a means for blowing gas through the bottom of the recess located at said first station and through the bottom of the mold,
  (iii) a pressing means for compressing said mixture in said mold,
 (E) a second station for curing said mixture in said mold when one of said molds set in said recesses is located thereat, said second station comprising a means for curing said binder,
 (F) a third station located above said turntable for removing a mold from said turntable, said third station being operative when one of said molds set in said recesses is located thereunder, and comprising
  (i) a lifting means for lifting a mold located on said turntable away from said turntable, and
  (ii) a lowering means for lowering a mold into a recess of said turntable, wherein the location of said molds set in said recesses in said turntable is such that when a recess is located at any one station, a recess is located at each station.

54. The apparatus of claim 53 wherein said curing means comprises means for blowing moist gas through the bottom of the recess located at said second station and through the bottom of said filled mold.

55. The apparatus of claim 53 wherein said first, second and third stations are structurally connected to said vertical support.

56. The apparatus of claim 53, wherein after said second station and before said third station, a fourth station is positioned, said fourth station located above said turntable and comprising a drilling means for drilling a hole vertically through the center of the mold cavity of a mold when one of said recesses is located under said fourth station, wherein when a recess is located at the first, second and third station, a recess is located at the fourth station.

57. The apparatus of claim 56, wherein said fourth station is structurally connected to said vertical support.

58. The apparatus of claim 56, wherein said third station further comprises a cleaning means associated with said lifting means for cleaning the internal surface of a mold.

59. The apparatus of claim 56, wherein said third station further comprises a means for applying a mold release agent to the internal surface of a mold, said applying means being associated with said lifting means.

60. The apparatus of claim 59, wherein said third station further comprises a cleaning means associated with said lifting means for cleaning the internal surface of a mold.

* * * * *